(12) United States Patent
Zarakas et al.

(10) Patent No.: US 11,676,167 B2
(45) Date of Patent: Jun. 13, 2023

(54) UTILIZING MACHINE LEARNING AND A SMART TRANSACTION CARD TO AUTOMATICALLY IDENTIFY ITEM DATA ASSOCIATED WITH PURCHASED ITEMS

(71) Applicant: Capital One Services, LLC, McLean, VA (US)

(72) Inventors: James Zarakas, Centreville, VA (US); Adam Vukich, Alexandria, VA (US); Molly Johnson, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 153 days.

(21) Appl. No.: 16/881,666

(22) Filed: May 22, 2020

(65) Prior Publication Data

US 2021/0365977 A1    Nov. 25, 2021

(51) Int. Cl.
| | |
|---|---|
| *G06Q 30/02* | (2023.01) |
| *G06Q 30/0207* | (2023.01) |
| *G06Q 30/0283* | (2023.01) |
| *G06Q 20/20* | (2012.01) |
| *G06N 20/00* | (2019.01) |
| *G06Q 20/34* | (2012.01) |
| *G06Q 30/0601* | (2023.01) |

(52) U.S. Cl.
CPC ......... *G06Q 30/0222* (2013.01); *G06N 20/00* (2019.01); *G06Q 20/208* (2013.01); *G06Q 20/341* (2013.01); *G06Q 30/0283* (2013.01); *G06Q 30/0611* (2013.01)

(58) Field of Classification Search
CPC .......... G06Q 30/0222; G06Q 30/0283; G06Q 30/0611
See application file for complete search history.

(56) References Cited

U.S. PATENT DOCUMENTS

| 9,911,290 | B1* | 3/2018 | Zalewski | G06Q 30/0633 |
| 2005/0149391 | A1* | 7/2005 | O'Shea | G06Q 30/0633 |
| | | | | 705/14.38 |
| 2009/0271275 | A1* | 10/2009 | Regmi | G06Q 30/0245 |
| | | | | 705/14.73 |

(Continued)

OTHER PUBLICATIONS

"A Review of Dimensionality Reduction Techniques for Efficient Computation" (Vekkuabgiri, S. et al. Available online Feb. 27, 2020, Version of Record Feb. 27, 2020. Procedia Computer Science vol. 165, 2019, pp. 104-111) (Year: 2020).*

Primary Examiner — James M Detweiler
(74) Attorney, Agent, or Firm — Harrity & Harrity, LLP

(57) ABSTRACT

A device may receive, from a client device associated with a customer, an agreement of the customer to join a rewards program, and may receive, from the client device and based on the customer joining the rewards program, item data identifying an item placed in a shopping cart by the customer and customer data identifying the customer, wherein the item data is received by a transaction card from a price tag of the item, and wherein the item data is received after the item has been removed from a shelf and placed in the shopping cart. The device may receive rewards data identifying rewards associated with a plurality of items, and may process the item data, the rewards data, and the customer data, with a machine learning model, to identify a reward for the customer. The device may provide, to the client device, data identifying the reward.

20 Claims, 14 Drawing Sheets

(56) References Cited

U.S. PATENT DOCUMENTS

| | | | |
|---|---|---|---|
| 2013/0073405 A1* | 3/2013 | Ariyibi | G06Q 20/20 |
| | | | 705/26.7 |
| 2014/0067531 A1* | 3/2014 | Douglas | G06Q 30/0253 |
| | | | 705/14.53 |
| 2015/0081474 A1* | 3/2015 | Kostka | H04W 12/06 |
| | | | 705/26.8 |
| 2015/0278849 A1* | 10/2015 | Reichert | G06Q 30/0276 |
| | | | 705/14.41 |
| 2016/0283925 A1* | 9/2016 | Lavu | G06Q 20/401 |
| 2017/0004472 A1* | 1/2017 | Tkachenko | G06Q 20/18 |
| 2017/0068982 A1* | 3/2017 | Vangala | G06Q 30/0224 |
| 2017/0228811 A1* | 8/2017 | Moreau | G06Q 30/0224 |
| 2018/0089585 A1* | 3/2018 | Rickard, Jr. | G06N 20/00 |
| 2018/0197197 A1* | 7/2018 | Singh | G06Q 30/0239 |
| 2019/0272557 A1* | 9/2019 | Smith | G06Q 30/0224 |
| 2020/0034812 A1* | 1/2020 | Nemati | G06Q 20/14 |
| 2020/0314598 A1* | 10/2020 | Lissick | G01C 21/38 |
| 2021/0295364 A1* | 9/2021 | Veettil | G06Q 30/0282 |

* cited by examiner

UTILIZING MACHINE LEARNING AND A SMART TRANSACTION CARD TO AUTOMATICALLY IDENTIFY ITEM DATA ASSOCIATED WITH PURCHASED ITEMS

BACKGROUND

In inventory management, a stock keeping unit (SKU) identifies a type of item for sale (e.g., a product or a service) and attributes associated with the item type that distinguish the item type from other item types. For example, attributes for a product may include a manufacturer of product, a description of the product, a material utilized in the product, a size of the product, a color of the product, packaging utilized for the product, warranty terms for the product, and/or the like.

SUMMARY

According to some implementations, a method may include receiving, from a client device associated with a customer, an agreement of the customer to join a rewards program in exchange for sharing data associated with items purchased by the customer, and receiving, from the client device and based on the customer joining the rewards program, item data identifying an item placed in a shopping cart by the customer and customer data identifying the customer, wherein the item data may be received by a transaction card from a price tag of the item and via a wireless communication with the price tag, and wherein the item data may be received after the client device receives, from a shelf sensor, first data indicating that the item has been removed from a shelf, and receives, from a shopping cart sensor, second data indicating that the item has been placed in the shopping cart. The method may include receiving rewards data identifying rewards associated with a plurality of items, and processing the item data, the rewards data, and the customer data, with a machine learning model, to identify a reward for the customer from multiple rewards associated with the item. The method may include receiving, from the client device, transaction data identifying the item, a price for the item, and a merchant selling the item when the customer purchases the item from the merchant, and providing, to the client device, data identifying the reward.

According to some implementations, a device may include one or more memories, and one or more processors to receive, from a client device associated with a customer, an agreement of the customer to join a rewards program in exchange for sharing data associated with items purchased by the customer. The one or more processors may receive, from the client device and based on the customer joining the rewards program, item data identifying an item placed in a shopping cart by the customer and customer data identifying the customer, wherein the item data may be received by a transaction card from a price tag of the item and via a wireless communication with the price tag. The one or more processors may receive rewards data identifying rewards associated with a plurality of items, and process the item data, the customer data, and the rewards data, with a machine learning model, to identify a reward for the customer from multiple rewards associated with the item. The one or more processors may cause the reward to be applied to the transaction card.

According to some implementations, a non-transitory computer-readable medium may store one or more instructions that, when executed by one or more processors of a device, may cause the one or more processors to receive, from a client device associated with a customer, an agreement of the customer to join a rewards program in exchange for sharing data associated with items purchased by the customer. The one or more instructions may cause the one or more processors to receive, from the client device and based on the customer joining the rewards program, item data identifying an item placed in a shopping cart by the customer and customer data identifying the customer, wherein the item data may be received by a transaction card from a price tag of the item and via a wireless communication with the price tag. The one or more instructions may cause the one or more processors to receive rewards data identifying rewards associated with a plurality of items, and process the item data, the customer data, and the rewards data, with a machine learning model, to identify a reward for the customer from multiple rewards associated with the item, wherein the machine learning model may be trained based on historical item data identifying the plurality of items, historical rewards data identifying historical rewards associated with the plurality of items, and historical customer data identifying historical customers. The one or more instructions may cause the one or more processors to perform one or more actions based on the reward.

DETAILED DESCRIPTION

Figure 1A:
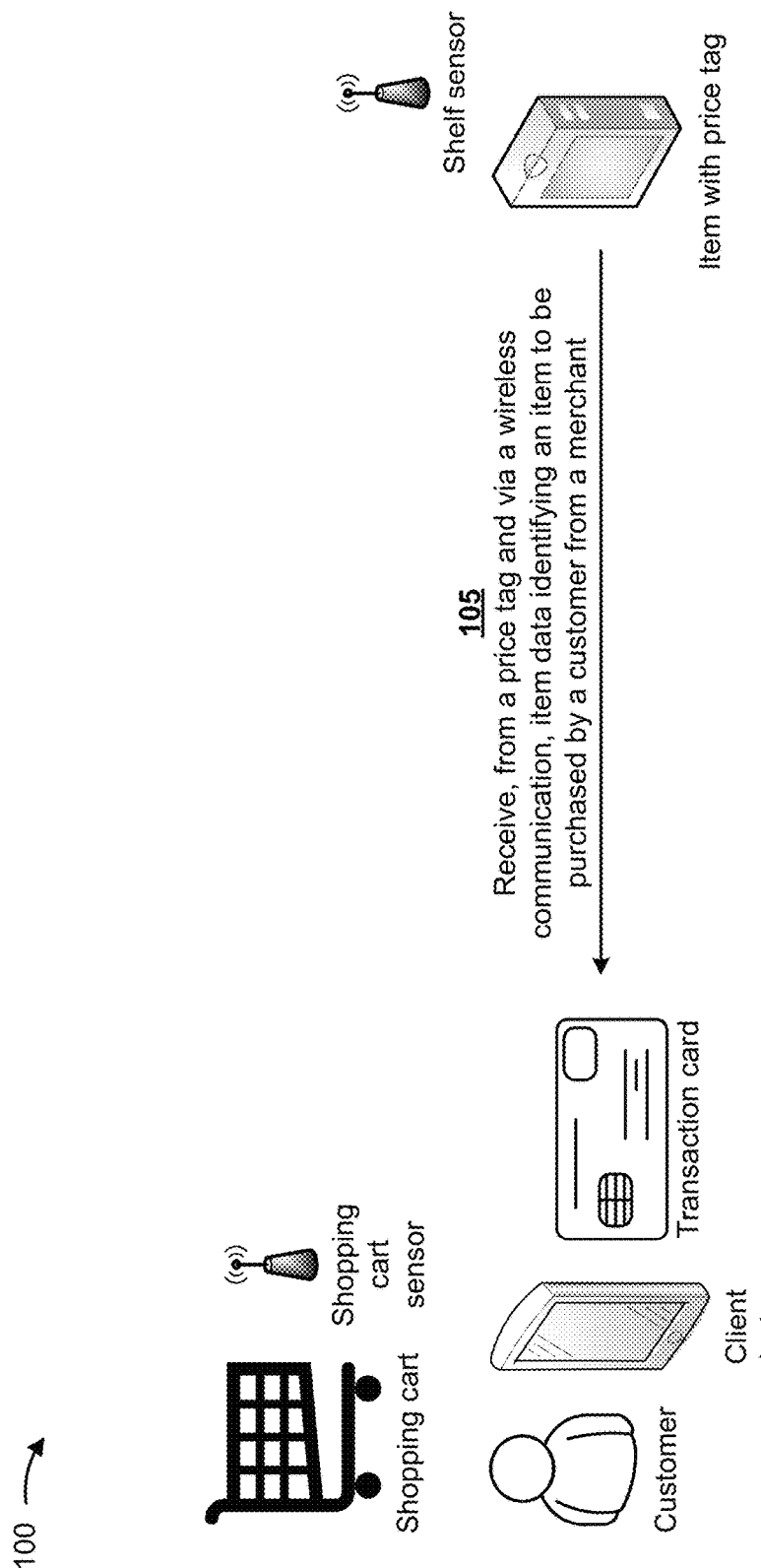
FIGS. 1A-1G are diagrams of one or more example implementations described herein.

The following detailed description of example implementations refers to the accompanying drawings. The same reference numbers in different drawings may identify the same or similar elements.

When a customer purchases items from a merchant, a point-of-sale (POS) device of the merchant may be utilized to scan the purchased items and complete a transaction for the purchased items. However, transaction data for the transaction associated with the purchased items does not typically provide item-level data (e.g., SKU data) associated with the purchased items. Rather, the transaction data typically includes only names of the items, prices of the items, and a merchant identifier. Thus, current techniques may waste computing resources (e.g., processing resources, memory resources, communication resources, and/or the like), networking resources, and/or the like associated with attempting to identify item-level data (e.g., SKU data) associated with the purchased items, determining identified item-level data is correct, requesting item-level data from customers, and/or like.

Some implementations described herein provide a processing platform that utilizes machine learning and a smart transaction card to automatically identify item data associated with purchased items. For example, the processing platform may receive, from a client device associated with a customer, an agreement of the customer to join a rewards program in exchange for sharing data associated with items purchased by the customer, and may receive, from the client device and based on the customer joining the rewards program, item data identifying an item placed in a shopping cart by the customer and customer data identifying the customer. The item data may be received by a transaction card from a price tag of the item and via a wireless communication with the price tag. The item data may be received after the client device receives, from a shelf sensor, first data indicating that the item has been removed from a shelf, and receives, from a shopping cart sensor, second data indicating that the item has been placed in the shopping cart. The processing platform may receive rewards data identifying rewards associated with a plurality of items, and may process the item data, the rewards data, and the customer data, with a machine learning model, to identify a reward for the customer from multiple rewards associated with the item. The processing platform may receive, from the client device, transaction data identifying the item, a price for the item, and a merchant selling the item when the customer purchases the item from the merchant, and may provide, to the client device, data identifying the reward.

In this way, the processing platform utilizes machine learning and a smart transaction card to automatically identify item data associated with purchased items in near-real time (e.g., while a customer is purchasing an item at a store of a merchant). For example, a customer may utilize the smart transaction card to wirelessly communicate with a price tag of an item and to receive item data. The smart transaction card may wirelessly communicate the item data to a mobile device of the customer, and the mobile device may provide the item data to the processing platform. The processing platform may identify a reward for the customer (e.g., from multiple item rewards) based on the customer sharing the item data. This, in turn, conserves computing resources, networking resources, and/or the like that would otherwise be wasted in attempting to identify item-level data (e.g., SKU data) associated with the purchased items, determining identified item-level data is correct, requesting item-level data from customers, and/or like.

FIGS. 1A-1G are diagrams of one or more example implementations 100 described herein. As shown in FIG. 1A, a client device may be associated with a transaction card and a customer. The client device may include a mobile device, a computer, and/or the like associated with the customer. The transaction card may include a credit card, a debit card, a rewards card, a prepaid card, and/or the like associated with the customer.

As further shown in FIG. 1A, and by reference number 105, the client device may receive, from a price tag and via a wireless communication, item data identifying an item (e.g., a product, an object representing a product or service, and/or the like) to be purchased by a customer from a merchant. For example, the transaction card may wirelessly receive the item data from the price tag, and may wirelessly provide the item data to the client device. The price tag may be on or attached to the item, may be on or attached to a shelf that holds or supports the item, may be otherwise located adjacent to the item, and/or the like. The transaction card and/or the client device may store the item data in a data structure (e.g., a database, a table, a list, and/or the like) associated with the transaction card and/or the client device.

The item data may include data that distinguishes an item type of the item from other item types. For example, the item data may include data identifying a manufacturer of the item, a description of the item, a material of the item, a size of the item, a color of the item, a package associated with the item, warranty terms associated with the item, and/or the like. In another example, the item data may include data associated with a stock keeping unit (SKU) corresponding to an item type of the item, a global trade item number (GTIN) of the item, a universal product code (UPC) of the item, and/or the like.

The transaction card may wirelessly receive the item data from the price tag via near-field communication (NFC), a Bluetooth® communication, and/or the like. For example, the transaction card may include a smart credit card equipped with NFC communication functionality including an NFC chip, an NFC antenna, a Bluetooth® component, and/or the like. In this case, the price tag may include NFC and/or Bluetooth® functionality (e.g., an NFC chip, an NFC antenna, a Bluetooth® component, and/or the like) capable of communicating with the transaction card. The transaction card may be placed in proximity to the price tag (e.g., by the customer tapping the transaction card on the price tag, waving the transaction card over the price tag, and/or the like), and may receive the item data from the price tag via a wireless communication. Thereafter, the transaction card may provide the item data to the client device via a wireless signal (e.g., a Bluetooth signal).

Figure 1B:
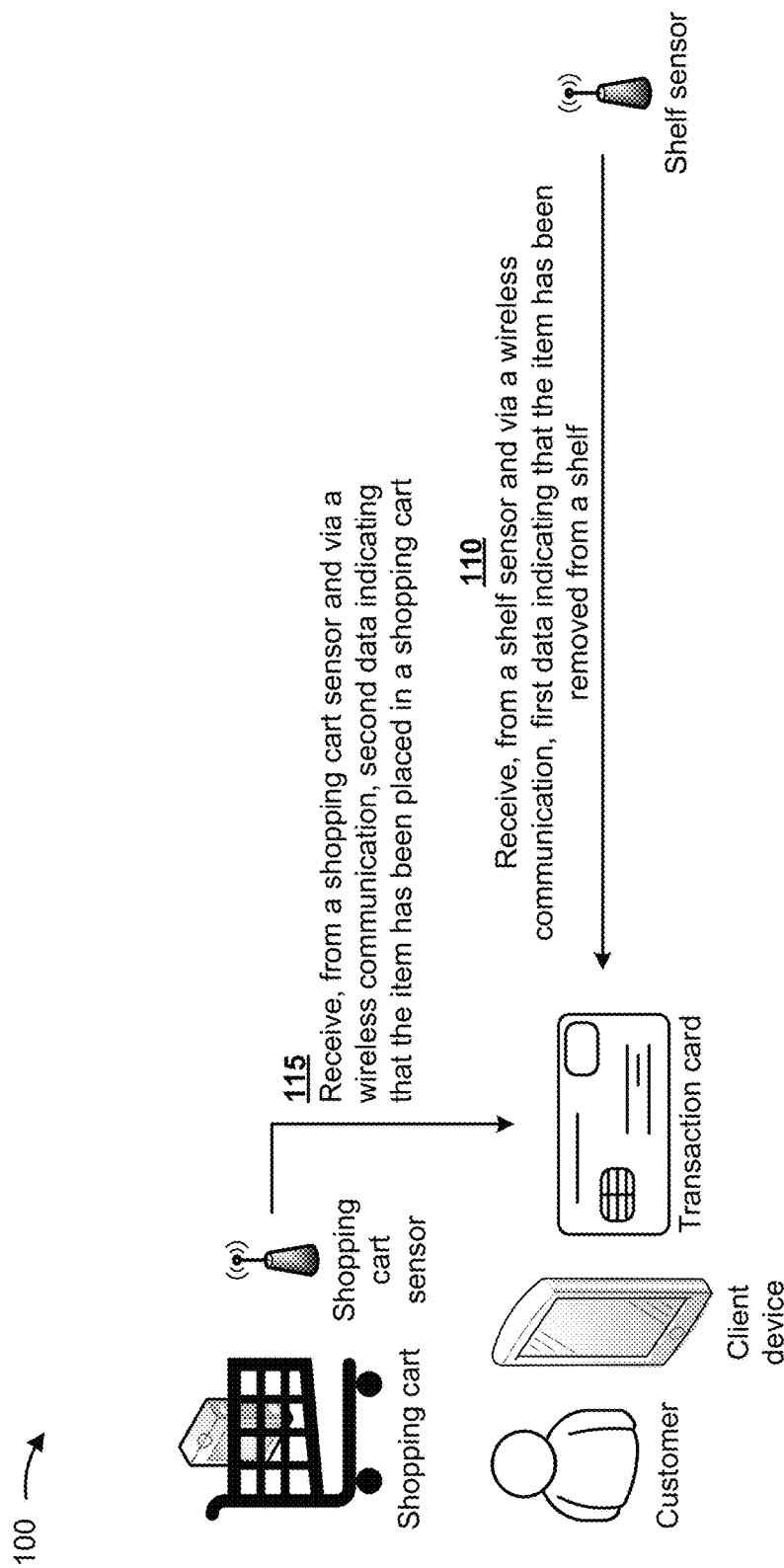

As shown in FIG. 1B, and by reference number 110, the client device may receive, from a shelf sensor and via a wireless communication, first data indicating that the item has been removed from a shelf. Alternatively, the transaction card may receive the first data from the shelf sensor, and may provide the first data to the client device. The shelf sensor may include a motion sensor, a light sensor, a camera, a pressure sensor, a scale, and/or the like that detects removal of the item. Upon detecting removal of the item, the shelf sensor may save and/or transmit the first data and/or make the first data available to be read by a device (e.g., the client device and/or the transaction card). For example, the shelf sensor may include a sensor that detects a weight associated with the item when the item is placed on the shelf, and determines that the item is removed from the shelf when the weight is no longer detectable. The shelf sensor may include wireless functionality (e.g., Bluetooth®) that enables the shelf sensor to provide the first data to the client device and/or the transaction card.

As further shown in FIG. 1B, and as shown by reference number 115, the client device may receive, from a shopping cart sensor and via a wireless communication, second data indicating that the item has been placed in a shopping cart. Alternatively, the transaction card may receive the second data from the shopping cart sensor, and may provide the second data to the client device. The shopping cart sensor may include a motion sensor, a light sensor, a camera, a pressure sensor, a scale, and/or the like that detects placement of the item in the shopping cart. Upon detecting placement of the item in the shopping cart, the shopping cart sensor may save and/or transmit the second data and/or make the second data available to be read by a device (e.g., the client device and/or the transaction card). For example, the shopping cart sensor may include a sensor that detects a weight associated with the item when the item is placed on the shopping cart, and determines that the item is placed in the shopping cart when the weight of the item is detected. The shopping cart sensor may include wireless functionality (e.g., Bluetooth®) that enables the shopping cart sensor to provide the second data to the client device and/or the transaction card.

In some implementations, the client device and/or the transaction card may receive the item data from the price tag (e.g., as described above in connection with FIG. 1A) after the client device and/or the transaction card receives the first data and/or the second data. In this way, the client device and/or the transaction card may identify and/or verify an intent of the purchaser to purchase the item before proceeding to obtain and/or process reward related information, as described below. Alternatively, the client device and/or the transaction card may receive the item data from the price tag before the client device and/or the transaction card receives the first data and/or the second data. In this way, the client device and/or the transaction card may provide the item data to a processing platform, described below, in exchange for a reward for the customer, as described below.

Figure 1C:
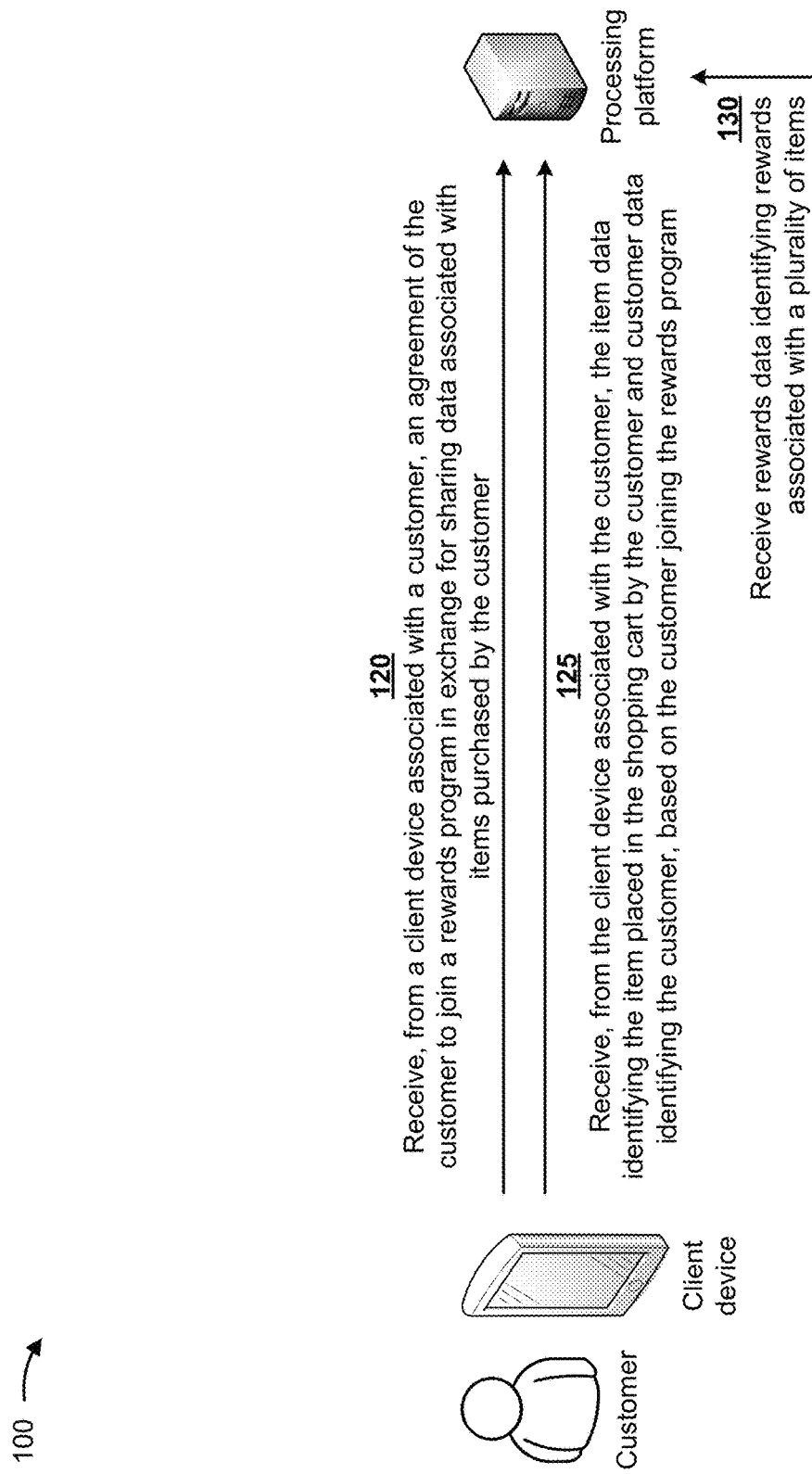

As shown in FIG. 1C, the client device may be associated with a processing platform. The processing platform may include a platform that utilizes machine learning and a smart transaction card to automatically identify rewards and submit reward requests, as described herein.

As further shown in FIG. 1C, and by reference number 120, the processing platform may receive, from the client device associated with the customer, an agreement of the customer to join a rewards program in exchange for sharing data associated with items purchased by the customer and/or viewed by the customer (e.g., the customer need not purchase the items). For example, the customer may utilize the client device to review terms of the rewards program and to agree to the terms of the rewards program. When the customer agrees to the terms of the rewards program, the client device may provide, to the processing platform, the agreement of the customer to join a rewards program. The processing platform may provide an application to the client device based on the customer joining the rewards program. The application may cause the client device to instruct the transaction card to capture item-related activity (e.g., based on receiving the item data, the first data, and/or the second data) and to provide the item-related data to the client device. The application may also cause the client device to provide the item-related data to the processing platform in exchange for rewards provided to the customer. Based on receiving the item-related data, the processing platform may confirm that the customer is a member of the rewards program.

The application may cause the client device to notify the processing platform about a potential purchase based on receiving the first data (e.g., indicating that the item has been removed from the shelf) and the second data (e.g., indicating that the item has been placed in the shopping cart). In this way, the application may verify an intent of the customer to purchase the item before notifying the processing platform. Alternatively, or additionally, the application may cause the client device to provide the item data to the processing platform when the item data is received by the transaction card. In this way, the client device may provide the item data to the processing platform in exchange for a reward for the customer. Alternatively, or additionally, the application may cause the client device to notify the processing platform of a potential purchase based only on receiving first data, which may enable the processing platform to be notified even if the item is carried by the customer rather than placed in the shopping cart. Additionally, or alternatively, the application may cause the client device to notify the processing platform of a potential purchase based only on receiving second data indicating that the item has been placed in a shopping cart. In this way, the application may notify the processing platform of a potential purchase even if the item was not on a shelf that includes a shelf sensor, if the shelf sensor is not operational, and/or the like.

As further shown in FIG. 1C, and by reference number 125, the processing platform may receive, from the client device associated with the customer, the item data identifying the item placed in the shopping cart by the customer and customer data identifying the customer, based on the customer joining the rewards program. For example, the processing platform may receive the item data and the customer data, from the client device, based on the agreement of the customer to join the rewards program and/or when the customer is a member of the rewards program. The customer data may include data identifying a name of the customer, an address of the customer, an email address of the customer, personal identification information of the customer, a transaction account of the customer associated with the transaction card, a rewards program identifier, and/or the like. The processing platform may store the item data and/or the customer data in a data structure (e.g., a database, a table, a list, and/or the like) associated with the processing platform.

As further shown in FIG. 1C, and by reference number 130, the processing platform may receive rewards data identifying rewards associated with a plurality of items. When receiving the rewards data, the processing platform may perform a crawl of a data source associated with the plurality of items, and may receive the rewards data identifying the rewards associated with the plurality of items based on performing the crawl of the data source. The rewards data may include data identifying quantities of money to receive for rewards (e.g., cash back rewards), percent discounts for purchases, additional items (e.g., buy one get one free), and/or the like. One or more items, of the plurality of items, may be associated with multiple, different rewards. The processing platform may store the rewards data in a data structure (e.g., a database, a table, a list, and/or the like) associated with the processing platform.

Figure 1D:
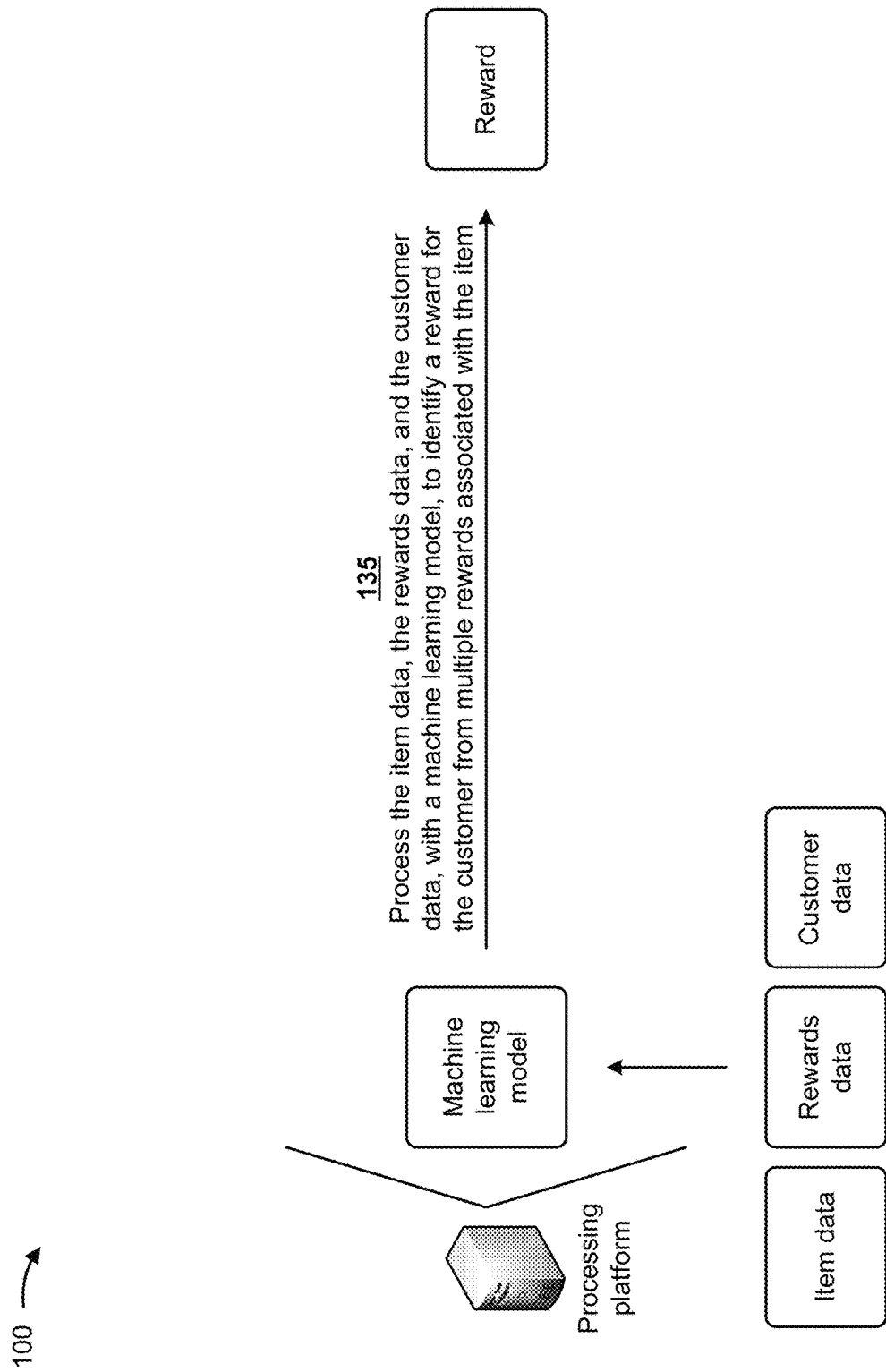

As shown in FIG. 1D, and by reference number 135, the processing platform may process the item data, the rewards data, and the customer data, with a machine learning model, to identify a reward for the customer from multiple rewards associated with the item. The machine learning model may include a linear classifier model, a nearest neighbor model, a support vector machine model, a decision tree model, a random forest model, a neural network model, and/or the like. The reward may include a reward provided by a financial institution associated with the transaction card, a reward providing a percent reduction in a selling price of the item, a reward providing money back to the customer, a reward providing reward points to the transaction card, and/or the like.

The machine learning model may identify the reward for the customer based on additional data associated with other customers. For example, the machine learning model may identify the reward based on rewards that were most used by the other customers (e.g., indicating rewards that were most meaningful to the other customers). The additional data may include geographical data (e.g., rewards used by other customers in a same geographical area as the customer), demographic data associated with the other customers having a same combination of one or more attributes (e.g., age group, gender, income level, education level, marital status, race, ethnicity, and/or the like) as the customer, and/or the like.

The processing platform may train the machine learning model with historical data (e.g., historical item data, historical rewards data, historical customer data, and/or the like) to generate a trained machine learning model. For example, the processing platform may train the machine learning model in a manner similar to the manner described below in connection with FIG. 2. The processing platform may receive historical item data identifying the plurality of items, historical rewards data identifying historical rewards associated with the plurality of items, and historical customer data identifying historical customers; and may train the machine learning model based on the historical item data, the historical rewards data, and the historical customer data. Rather than training the machine learning model, the processing platform may obtain the machine learning model from another system or device that trained the machine learning model. In this case, the processing platform may provide the other system or device with historical data for use in training the machine learning model, and may provide the other system or device with updated historical data to retrain the machine learning model in order to update the machine learning model. When processing the item data, the rewards data, and the customer data, the processing platform may apply the machine learning model in a manner similar to the manner described below in connection with FIG. 3.

The processing platform may generate a promotion as the reward for the customer based on spending patterns. For example, the processing platform may determine spending patterns associated with the customer based on the item data, may generate a promotion for the customer based on the spending patterns associated with the customer, and may provide data identifying the promotion to the client device. As another example, the processing platform may determine spending patterns associated with the customer based on the item data, and may provide, to a server device associated with a merchant of the item, data identifying the spending patterns associated with the customer. In this case, the spending patterns may enable the server device to generate a promotion for the customer and to provide data identifying the promotion to the client device.

The processing platform may generate a promotion as a reward for the customer based on a relationship of the item to another item. For example, the processing platform may determine, based on the item data, a relationship between the item and another item in the plurality of items, may generate a promotion for the other item based on the relationship between the item and the other item, and may provide data identifying the promotion to the client device. As another example, the processing platform may determine, based on the item data, a relationship between the item and another item in the plurality of items, and may provide, to a server device associated with a merchant of the item, data identifying the relationship between the item and the other item. In this case, the relationship may enable the server device to generate a promotion for the other item and to provide data identifying the promotion to the client device.

Figure 1E:
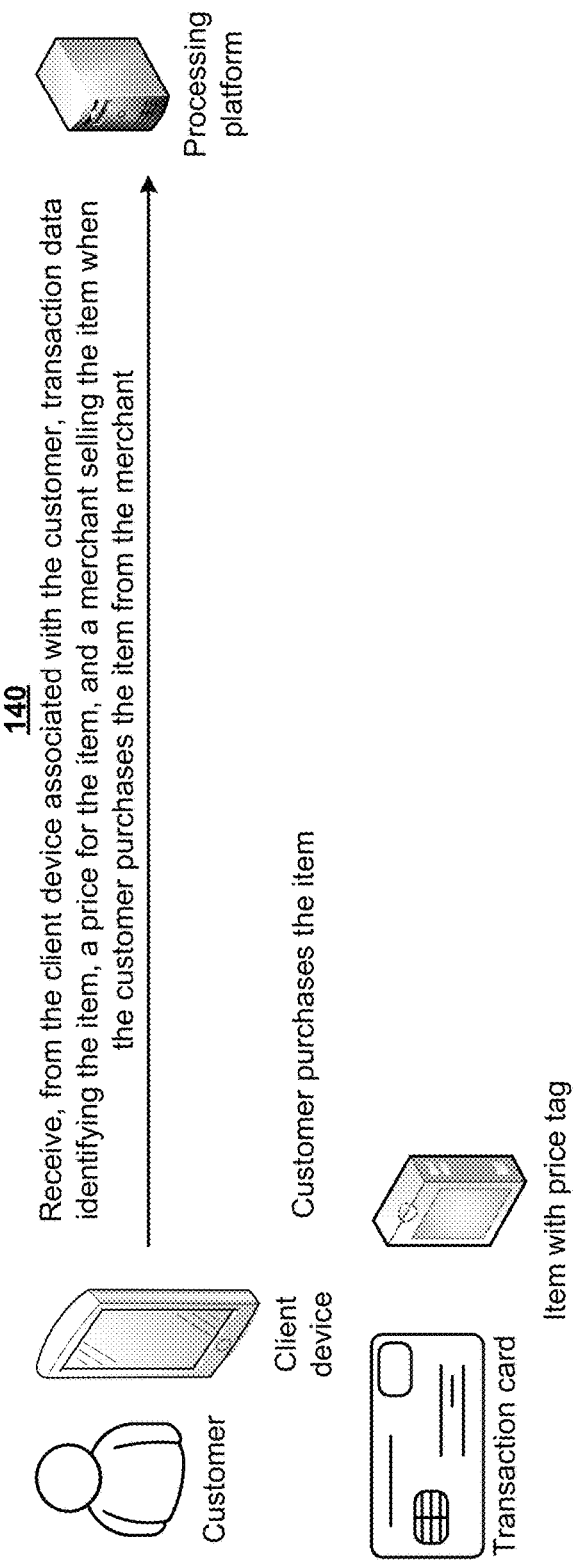

As shown in FIG. 1E, and by reference number 140, the processing platform may receive, from the client device associated with the customer, transaction data identifying the item, a price for the item, and a merchant selling the item when the customer purchases the item from the merchant. Additionally, or alternatively, the processing platform may receive the transaction data from another system or device, such as a point-of-sale (POS) system or terminal associated with the merchant. In addition to the first data and the second data, the processing platform may use the transaction data to verify a completed purchase of the item by the customer. The processing platform may store the transaction data in a data structure (e.g., a database, a table, a list, and/or the like) associated with the processing platform.

Figure 1F:
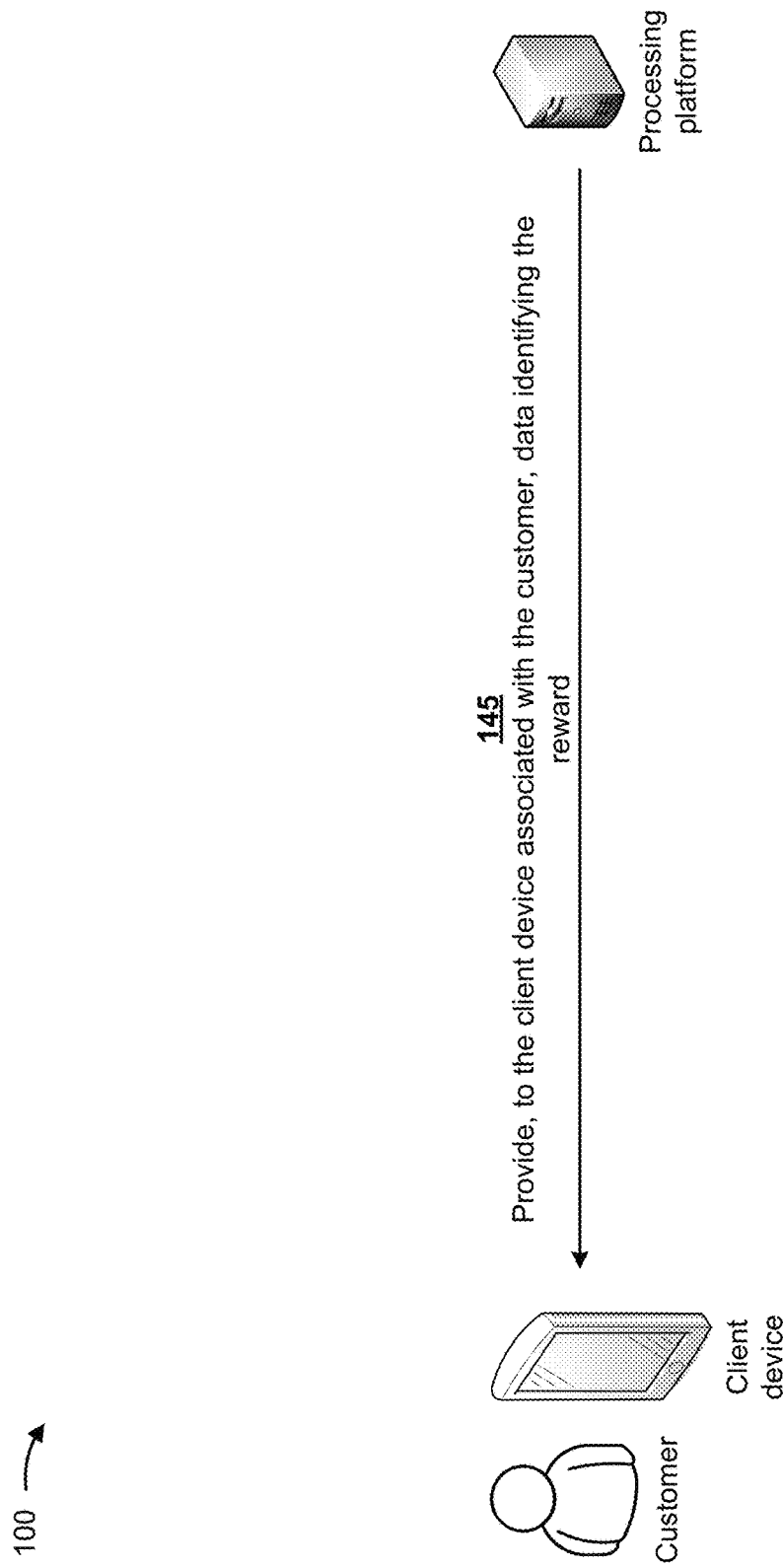

As shown in FIG. 1F, and by reference number 145, the processing platform may provide, to the client device associated with the customer, data identifying the reward. For example, the processing platform may provide the data identifying the reward upon verifying the completed purchase by the customer (e.g., based on receiving the transaction data, as described above). In this way, the processing platform may ensure the reward is earned by the customer. Alternatively, or additionally, the processing platform may provide the data identifying the reward to the client device when the item is received from the client device. In this way, the processing platform may receive the item data (e.g., which may be utilized by an entity associated with the processing platform) in exchange for the reward.

The processing platform may modify the reward after identifying the reward. For example, the processing platform may determine spending patterns associated with the customer based on the item data, may modify the reward (e.g., increase or decrease the amount of the reward) based on the spending patterns and to generate a modified reward, and may provide data identifying the modified reward to the client device. Additionally, or alternatively, the processing platform may modify the reward based on other information associated with a purchase history of the customer, based on the transaction data, and/or the like. In such cases, the processing platform may provide data identifying the modified reward to the client device.

Figure 1G:
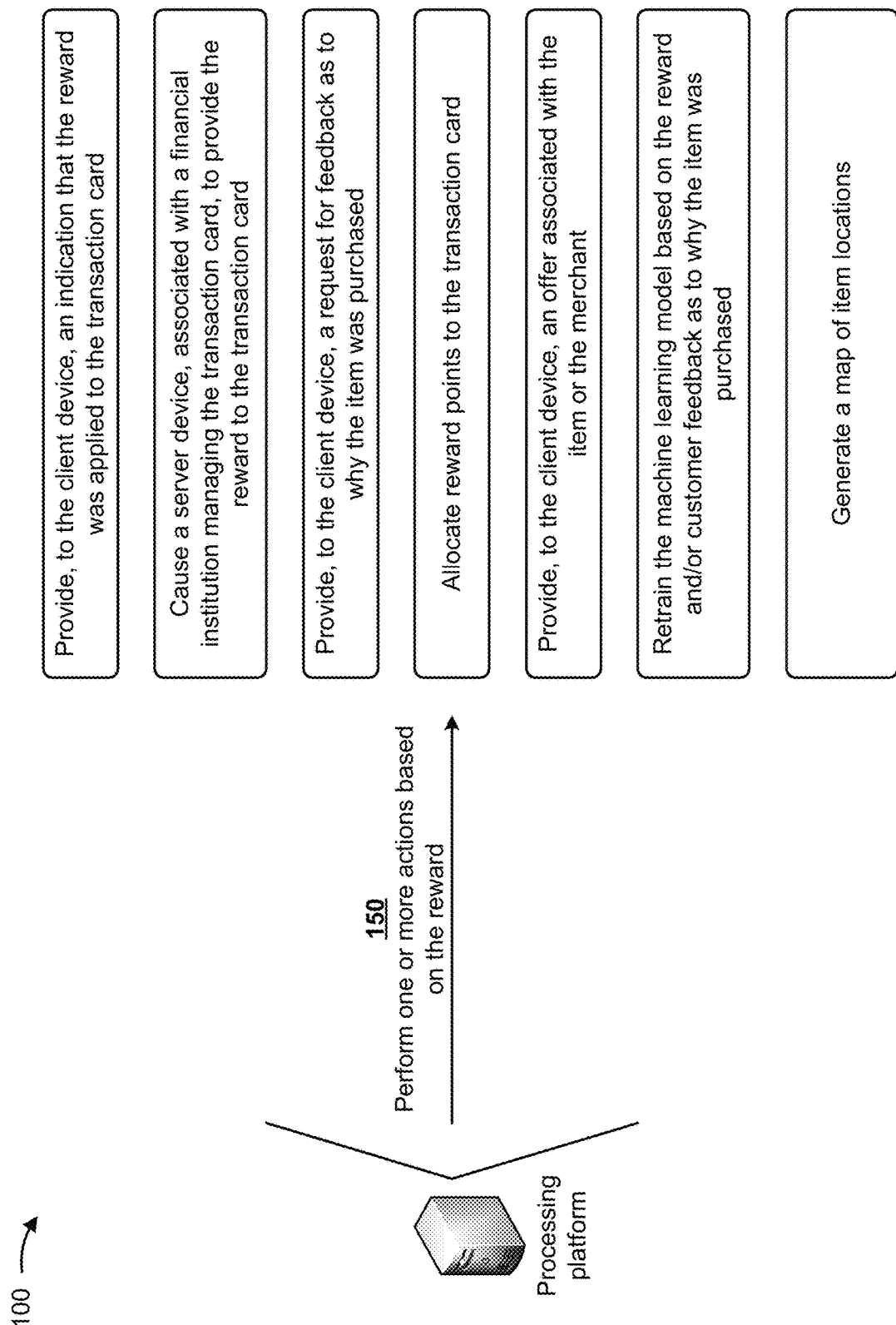

As shown in FIG. 1G, and by reference number 150, the processing platform may perform one or more actions based on the reward. The one or more actions may include the processing platform providing, to the client device, an indication that the reward was applied to the transaction card. The processing platform may inform the customer of the reward in near-real time, which may encourage the customer to associate the reward with the purchase, thereby incentivizing the customer compared to a less immediate means of notification (e.g., a statement, an email, postal mail, and/or the like). In this way, the processing platform may increase revenue associated with purchased items, may conserve resources (e.g., computing resources, networking resources, and/or the like) that would otherwise be required to notify and/or incentivize the customer by other means, and/or the like.

The one or more actions may include the processing platform causing a server device, associated with a financial institution managing the transaction card, to provide the reward to the transaction card. The processing platform may enable the financial institution managing the transaction card to receive the benefit of customer appreciation, to manage rewards for particular objectives, and/or the like. In this way, the processing platform may automatically increase customer loyalty and business generation in near-real time, thereby conserving resources (e.g., computing resources, networking resources, and/or the like) that would otherwise be required to generate business.

The one or more actions may include the processing platform providing, to the client device, a request for feedback as to why the item was purchased. For example, the processing platform may provide a survey, a form, a request, and/or the like for the feedback and may receive the completed survey, the completed form, a response, and/or the like from the client device. In this way, the processing platform may obtain information that can be provided to businesses, merchants, financial institutions, and/or the like that help them make better decisions about what products and/or services to offer, what rewards to offer, prices associated with products and/or services, when to offer products, services, or rewards, and/or the like, which may improve a return on investment, conserve resources by improving efficiency, and/or the like.

The one or more actions may include the processing platform allocating reward points to the transaction card. For example, the processing platform may allocate a quantity of reward points determined by the machine learning model. In this way, the processing platform may encourage the customer to engage in more transactions so as to accumulate enough reward points to redeem the reward points for an item of interest to the customer, which may increase business and conserve resources that would otherwise be required to encourage the customer to engage in more transactions.

The one or more actions may include the processing platform providing, to the client device, an offer associated with the item or the merchant. For example, the processing platform may provide an offer for an additional item when the customer purchases a particular item. In this way, the processing platform may automatically incentivize the customer to make additional purchases, while also providing an opportunity to purchase a particular product and/or service. The offer may be based on a recommendation by the machine learning model, based on a need to sell a particular product and/or service, based on a likelihood that the customer will purchase the particular product and/or service, and/or the like.

The one or more actions may include the processing platform retraining the machine learning model based on the reward and/or customer feedback as to why the item was purchased. In this way, the processing platform may improve the accuracy of the machine learning model in processing the item data, the rewards data, and the customer data to identify the reward for the customer from multiple rewards associated with the item, which may improve speed and efficiency of the machine learning model and conserve computing resources, networking resources, and/or the like.

The one or more actions may include the processing platform generating a map of item locations. For example, based the processing platform may receive information indicating a location (e.g., location information, location data, and/or the like) of the client device and/or the transaction card when the client device and/or transaction card obtains item data (e.g., from a price tag), when the item is placed in a shopping cart, when the item is removed from a shelf, based on sensor data from the client device and/or transaction card (e.g., accelerometer and/or gyroscope data indicating a movement pattern and/or that movement has stopped), and/or the like. In some implementations, the client device and/or the transaction card may determine the location, such as by using a global positioning system (GPS) sensor, using an NFC sensor, using a map that indicates a location of the client device and/or transaction card relative to other client devices and/or transaction cards, and/or the like. In some implementations, the location may include data indicating a height and/or an elevation (e.g., a height of a store shelf where the item is obtained), such as by using sensor data (e.g., accelerometer and/or gyroscope data). The client device and/or transaction card may provide information that indicates the location to the processing platform. The client device and/or transaction card may also provide item data to the processing platform, as described elsewhere herein. Additionally, or alternatively, the processing platform may obtain the item data by analyzing a transaction history associated with the customer to identify the item.

The processing platform may use a machine learning model to analyze location data and/or transaction data across different customers, item data received from different client devices and/or transaction cards, item data obtained by analyzing transaction histories, and/or the like. Based on the analysis, the processing platform may determine locations of items within a retail store, and may generate a map indicating those locations. The processing platform may store the map, may output the map (e.g., for display), may transmit information that enables the map to be rendered on another device, and/or the like. In some implementations, the processing platform may provide labels for items on the map, such as a location label (e.g., an aisle number or identifier, a shelf number or identifier, and/or the like).

Furthermore, there may be hundreds, thousands, and/or the like, of client devices that produce thousands, millions, billions, and/or the like, of data points provided in the item data, the rewards data, the customer data, and/or the transaction data. In this way, the processing platform may handle thousands, millions, billions, and/or the like, of data points within a period of time (e.g., daily, weekly, monthly), and thus may provide "big data" capability.

In this way, several different stages of the process for identifying item data associated with purchased items are automated via machine learning and a smart transaction card, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes machine learning and a smart transaction card to automatically identify item data associated with purchased items in the manner described herein. Finally, the process for utilizing machine learning and a smart transaction card to automatically identify item data associated with purchased items conserves computing resources, networking resources, and/or the like that would otherwise be wasted in attempting to identify item-level data (e.g., SKU data) associated with the purchased items, determining identified item-level data is correct, requesting item-level data from customers, and/or like.

As indicated above, FIGS. 1A-1G are provided merely as examples. Other examples may differ from what is described with regard to FIGS. 1A-1G.

Figure 2:
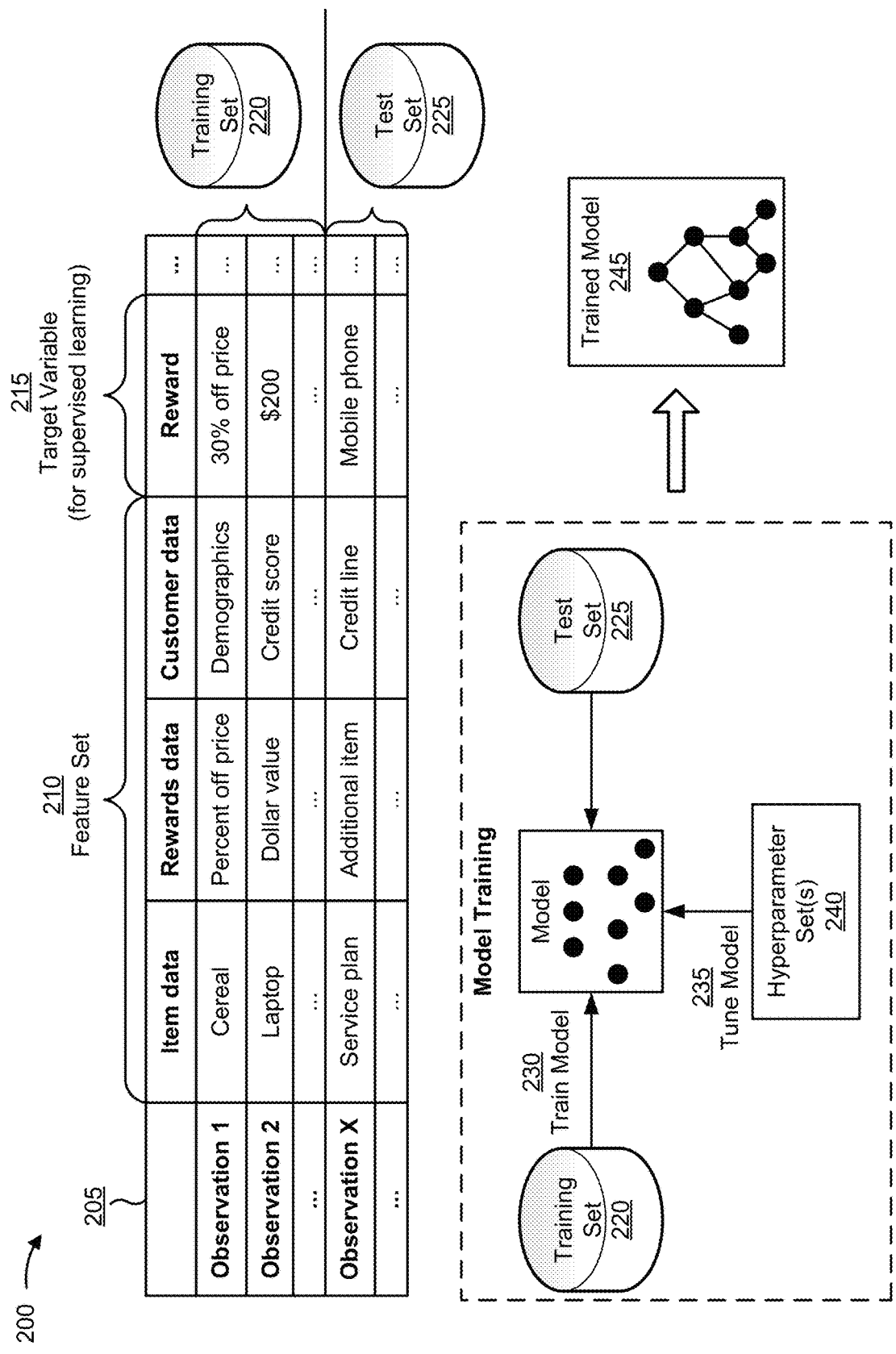
FIG. 2 is a diagram illustrating an example of training a machine learning model.

FIG. 2 is a diagram illustrating an example 200 of training a machine learning model. The machine learning model training described herein may be performed using a machine learning system. The machine learning system may include a computing device, a server, a cloud computing environment, and/or the like, such as the client device and/or the processing platform.

As shown by reference number 205, a machine learning model may be trained using a set of observations. The set of observations may be obtained and/or input from historical data, such as data gathered during one or more processes described herein. For example, the set of observations may include data gathered from user interaction with and/or user input to the processing platform, as described elsewhere herein. In some implementations, the machine learning system may receive the set of observations (e.g., as input) from the client device.

As shown by reference number 210, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from the client device. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from the client device, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of item data, a second feature of rewards data, a third feature of customer data, and so on. As shown, for a first observation, the first feature may have a value of cereal, the second feature may have a value of percent off price, the third feature may have a value of demographics, and so on. These features and feature values are provided as examples, and may differ in other examples. For example, the feature set may include one or more of the following features: item data (e.g., data identifying a price of an item to be purchased, a manufacturer of the item, a description of the item, a quantity of the item, and/or the like); rewards data (e.g., data identifying a financial institution reward, a percentage off a price, a dollar value, additional items to be received based on a purchase of the item, and/or the like); customer data (e.g., demographics, a credit score, a credit line, an account identifier, and/or the like); and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory, and/or the like) used to train the machine learning model.

As shown by reference number 215, the set of observations may be associated with a target variable type (e.g., a reward). The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations (e.g., different words, phrases, sentences, and/or the like) may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the test set 220 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like).

Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/or the like). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k–1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 3:
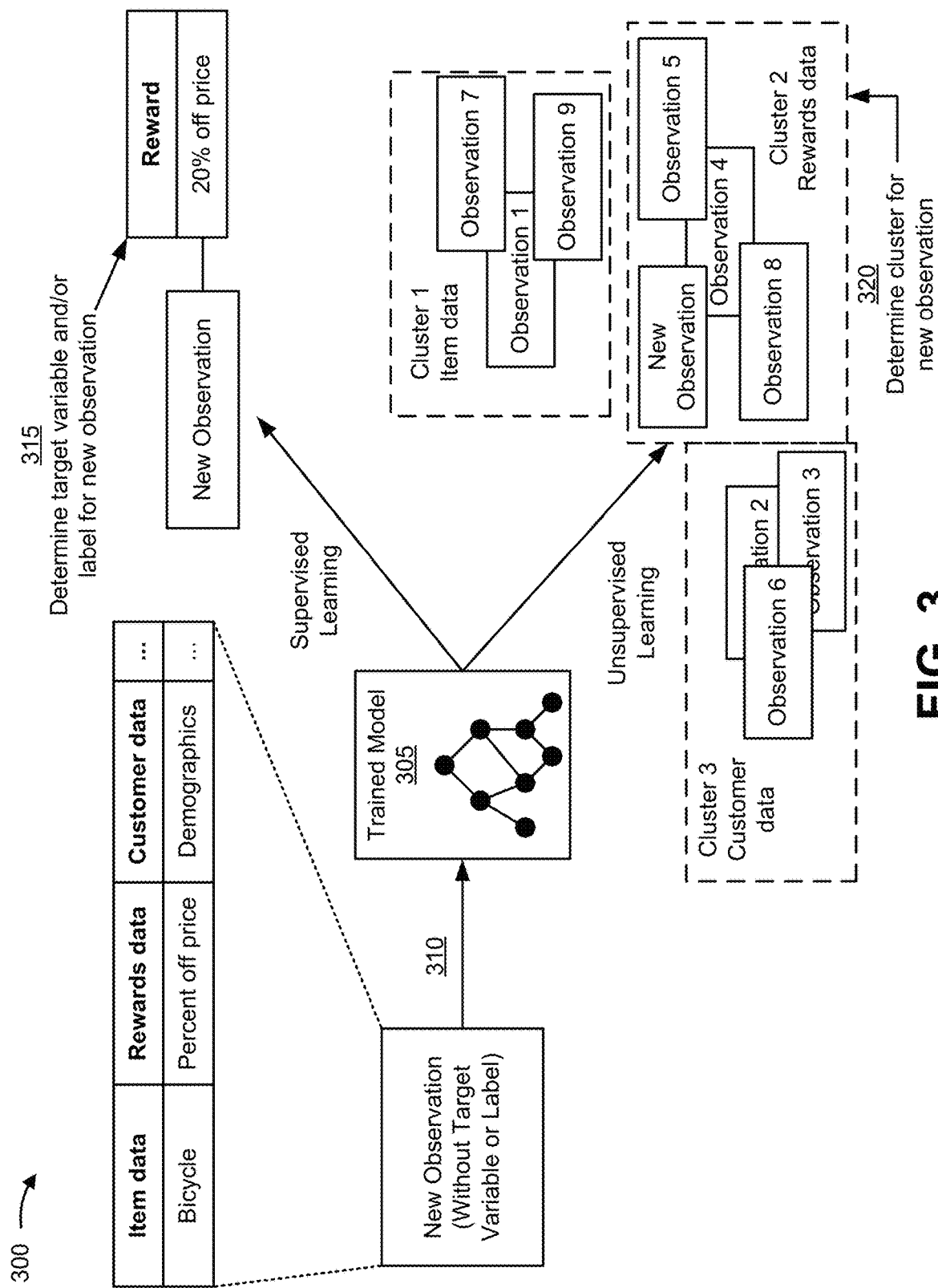
FIG. 3 is a diagram illustrating an example of applying a trained machine learning model to a new observation.

FIG. 3 is a diagram illustrating an example 300 of applying a trained machine learning model to a new observation. The new observation may be input to a machine learning system that stores a trained machine learning model 305. In some implementations, the trained machine learning model 305 may be the trained machine learning model 245 described above in connection with FIG. 2. The machine learning system may include a computing device, a server, a cloud computing environment, and/or the like, such as the processing platform.

As shown by reference number 310, the machine learning system may receive a new observation (or a set of new observations), and may input the new observation to the machine learning model 305. As shown, the new observation may include a first feature of item data (e.g., bicycle), a second feature of rewards data (e.g., a percent off price), a third feature of customer data (e.g., demographics), and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of a target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observations and one or more prior observations (e.g., which may have previously been new observations input to the machine learning model and/or observations used to train the machine learning model), and/or the like, such as when unsupervised learning is employed.

In some implementations, the trained machine learning model 305 may predict "20% off price" for the target variable of reward, as shown by reference number 315. Based on this prediction (e.g., based on the value having a particular label/classification, based on the value satisfying or failing to satisfy a threshold, and/or the like), the machine learning system may provide a recommendation, such as the 20% off the price is the reward for providing item data associated with the bicycle. Additionally, or alternatively, the machine learning system may perform an automated action and/or may cause an automated action to be performed (e.g., by instructing another device to perform the automated action), such as utilizing the 20% off the price as a reward for providing item data associated with the bicycle. As another example, if the machine learning system were to predict a value of "$400" for the target variable of reward, then the machine learning system may provide a different recommendation (e.g., $400 is the reward for providing item data associated with the bicycle) and/or may perform or cause performance of a different automated action (e.g., utilize the $400 as a reward for providing item data associated with the bicycle). In some implementations, the recommendation and/or the automated action may be based on the target variable value having a particular label (e.g., classification, categorization, and/or the like), may be based on whether the target variable value satisfies one or more thresholds (e.g., whether the target variable value is greater than a threshold, is less than a threshold, is equal to a threshold, falls within a range of threshold values, and/or the like), and/or the like.

In some implementations, the trained machine learning model 305 may classify (e.g. cluster) the new observation in an item data cluster, as shown by reference number 320. The observations within a cluster may have a threshold degree of similarity. Based on classifying the new observation in the item data cluster, the machine learning system may provide a recommendation, such as the reward may be used for the purchase of the bicycle. Additionally, or alternatively, the machine learning system may perform an automated action and/or may cause an automated action to be performed (e.g., by instructing another device to perform the automated action), such as using the reward for the purchase of the bicycle. As another example, if the machine learning system were to classify the new observation in a merchant information cluster, then the machine learning system may provide a different recommendation (e.g., a merchant reward for the purchase of the bicycle) and/or may perform or cause performance of a different automated action (e.g., using the merchant reward for the purchase of the bicycle). As still another example, if the machine learning system were to classify the new observation in a customer data cluster, then the machine learning system may provide a different recommendation (e.g., another reward may be used with the purchase of the bicycle) and/or may perform or cause performance of a different automated action (e.g., using the other reward for the purchase of the bicycle).

In this way, the machine learning system may apply a rigorous and automated process to automatically identify item data associated with purchased items. The machine learning system enables recognition and/or identification of tens, hundreds, thousands, or millions of features and/or feature values for tens, hundreds, thousands, or millions of observations, thereby increasing an accuracy and consistency of automatically identifying item data associated with purchased items relative to requiring computing resources to be allocated for tens, hundreds, or thousands of operators to manually identify item data associated with purchased items.

As indicated above, FIG. 3 is provided as an example. Other examples may differ from what is described in connection with FIG. 3.

Figure 4:
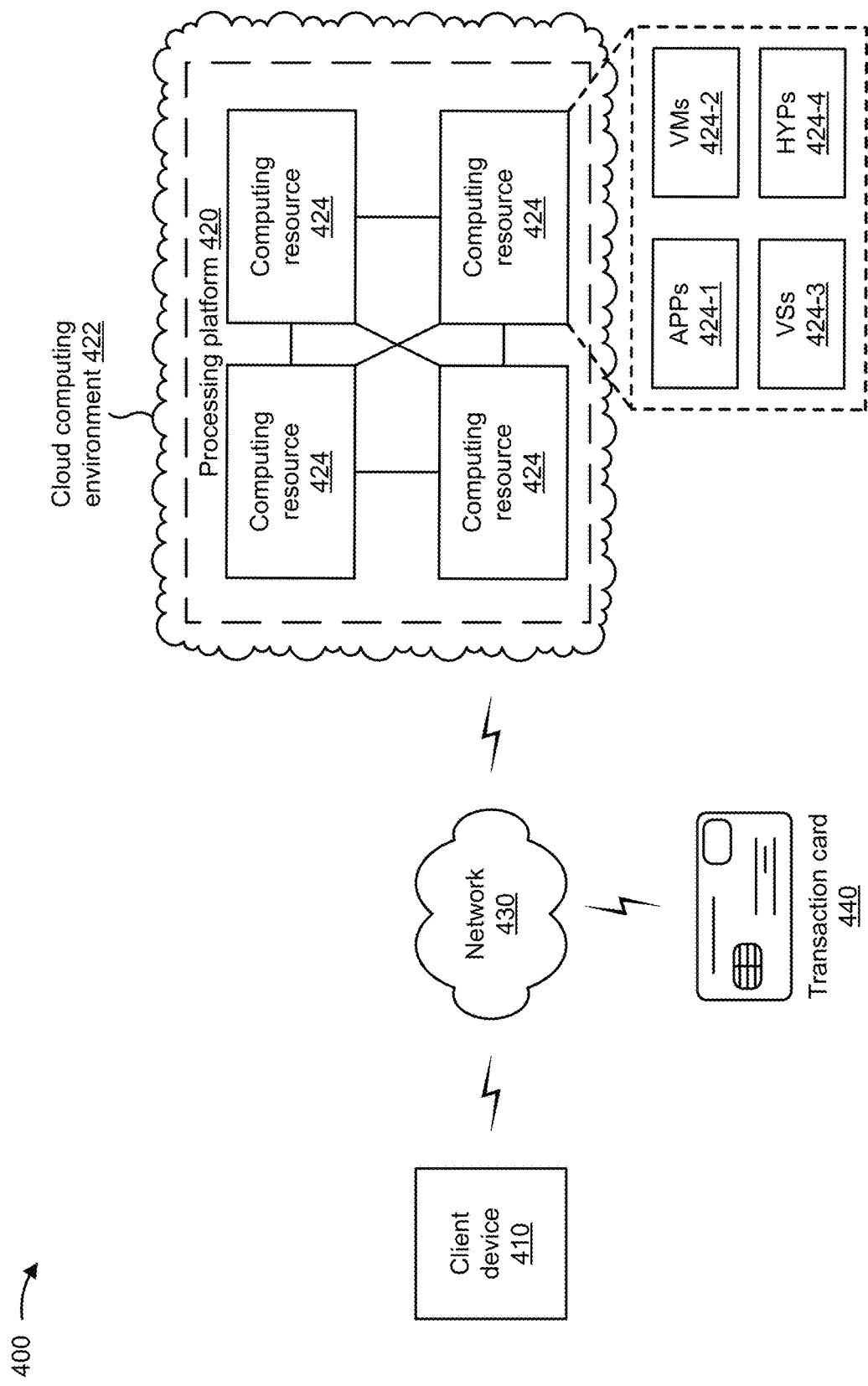
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a client device 410, a processing platform 420, a network 430, and a transaction card 440. Devices of environment 400 may interconnect via wired connections, wireless connections, or a combination of wired and wireless connections.

Client device 410 includes one or more devices capable of receiving, generating, storing, processing, and/or providing information, such as information described herein. For example, client device 410 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 410 may receive information from and/or transmit information to processing platform 420.

Processing platform 420 includes one or more devices that utilize machine learning and a smart transaction card to automatically identify item data associated with purchased items. In some implementations, processing platform 420 may be designed to be modular such that certain software components may be swapped in or out depending on a particular need. As such, processing platform 420 may be easily and/or quickly reconfigured for different uses. In some implementations, processing platform 420 may receive information from and/or transmit information to one or more client devices 410.

In some implementations, as shown, processing platform 420 may be hosted in a cloud computing environment 422. Notably, while implementations described herein describe processing platform 420 as being hosted in cloud computing environment 422, in some implementations, processing platform 420 may not be cloud-based (i.e., may be implemented outside of a cloud computing environment) or may be partially cloud-based.

Cloud computing environment 422 includes an environment that hosts processing platform 420. Cloud computing environment 422 may provide computation, software, data access, storage, etc., services that do not require end-user knowledge of a physical location and configuration of system(s) and/or device(s) that hosts processing platform 420. As shown, cloud computing environment 422 may include a group of computing resources 424 (referred to collectively as "computing resources 424" and individually as "computing resource 424").

Computing resource 424 includes one or more personal computers, workstation computers, mainframe devices, or other types of computation and/or communication devices. In some implementations, computing resource 424 may host processing platform 420. The cloud resources may include compute instances executing in computing resource 424, storage devices provided in computing resource 424, data transfer devices provided by computing resource 424, etc. In some implementations, computing resource 424 may communicate with other computing resources 424 via wired connections, wireless connections, or a combination of wired and wireless connections.

As further shown in FIG. 4, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, and/or the like.

Application 424-1 includes one or more software applications that may be provided to or accessed by client device 410. Application 424-1 may eliminate a need to install and execute the software applications on client device 410. For example, application 424-1 may include software associated with processing platform 420 and/or any other software capable of being provided via cloud computing environment 422. In some implementations, one application 424-1 may send/receive information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system ("OS"). A process virtual machine may execute a single program and may support a single process. In some implementations, virtual machine 424-2 may execute on behalf of a user (e.g., a user of client device 410 or an operator of processing platform 420), and may manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Transaction card 440 includes a transaction card that can be used to complete a transaction. For example, transaction card 440 may include a credit card, a debit card, a gift card, a payment card, an automated teller machine (ATM) card, a stored-value card, a fleet card, a room or building access card, a driver's license card, and/or the like. Transaction card 440 may be capable of storing and/or communicating data for a POS transaction with a transaction terminal. For example, transaction card 440 may store and/or communicate data, including account information (e.g., an account identifier, a cardholder identifier, etc.), expiration information of transaction card 440 (e.g., information identifying an expiration month and/or year of transaction card 440), banking information (e.g., a routing number of a bank, a bank identifier, etc.), transaction information (e.g., a payment token), and/or the like. For example, to store and/or communicate the data, transaction card 440 may include a magnetic strip and/or an integrated circuit (IC) chip.

In some implementations, transaction card 440 may include an antenna to communicate data associated with transaction card 440. The antenna may be a passive radio frequency (RF) antenna, an active RF antenna, a battery-assisted RF antenna, and/or the like. In some implementations, transaction card 440 may be a smart transaction card, capable of communicating wirelessly (e.g., via Bluetooth, Bluetooth Low Energy (BLE), near-field communication (NFC), WiFi, and/or the like) with other devices, such as client device 410, processing platform 420, a digital wallet, an NFC attached to a price tag, and/or the like. In some implementations, transaction card 440 may communicate with client device 410 to complete a transaction (e.g., based on being moved within communicative proximity of client device 410).

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
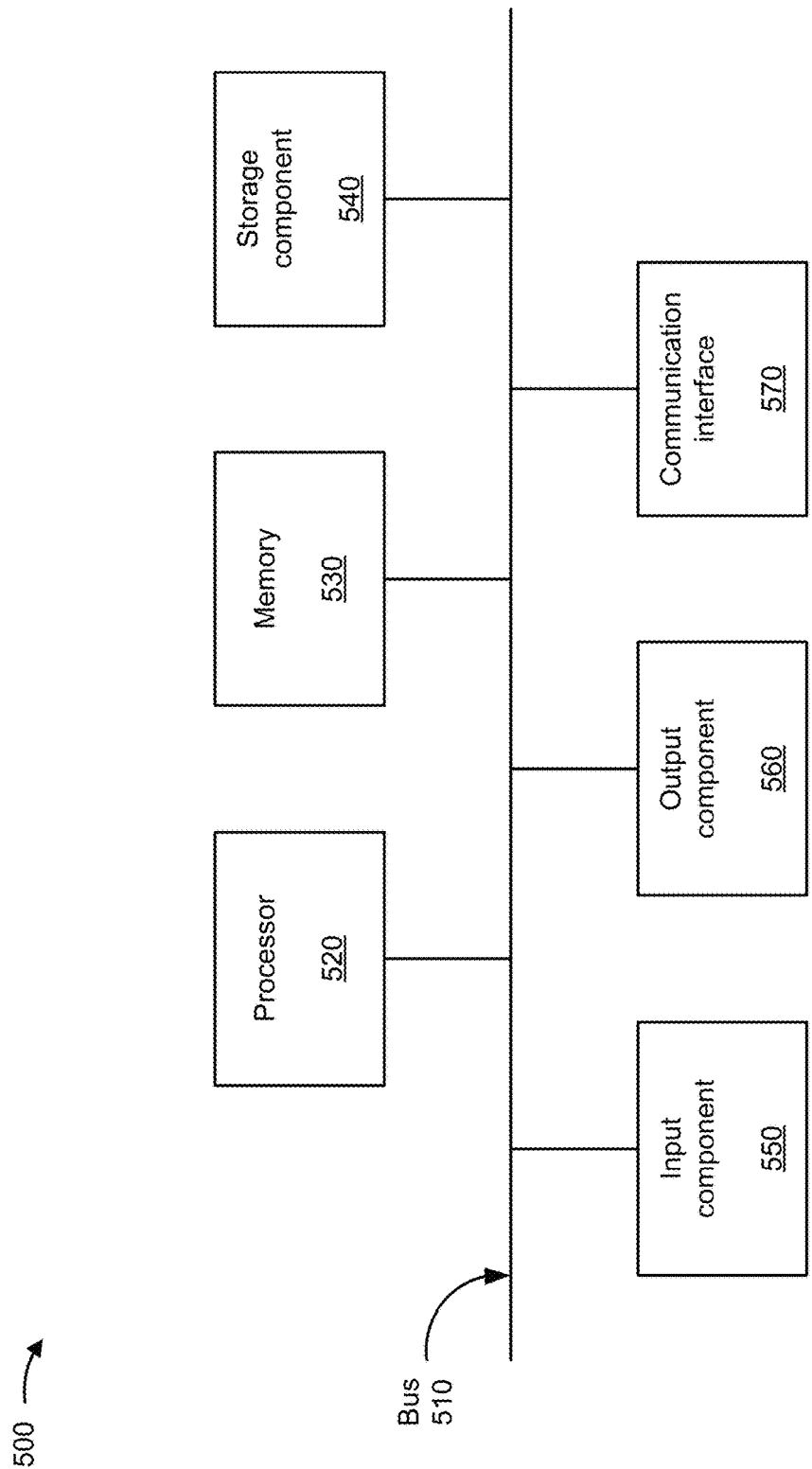
FIG. 5 is a diagram of example components of one or more devices of FIG. 4.

FIG. 5 is a diagram of example components of a device 500. Device 500 may correspond to client device 410, processing platform 420, computing resource 424, and/or transaction card 440. In some implementations, client device 410, processing platform 420, computing resource 424, and/or transaction card 440 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
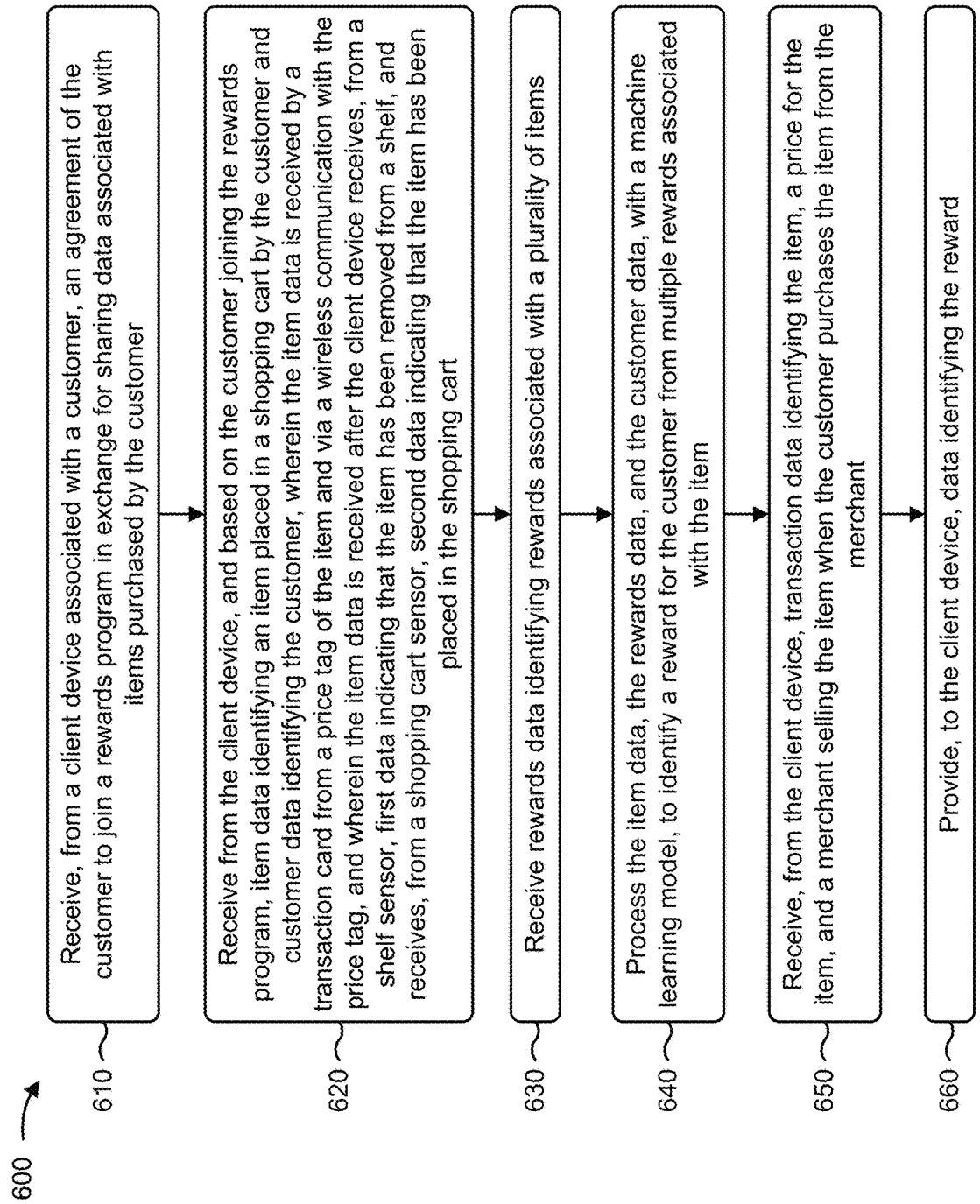
FIGS. 6-8 are flow charts of example processes for utilizing machine learning and a smart transaction card to automatically identify item data associated with purchased items.

FIG. 6 is a flow chart of an example process 600 for utilizing machine learning and a smart transaction card to automatically identify item data associated with purchased items. In some implementations, one or more process blocks of FIG. 6 may be performed by a device (e.g., processing platform 420). In some implementations, one or more process blocks of FIG. 6 may be performed by another device or a group of devices separate from or including the device, such as a client device (e.g., client device 410).

As shown in FIG. 6, process 600 may include receiving, from a client device associated with a customer, an agreement of the customer to join a rewards program in exchange for sharing data associated with items purchased by the customer (block 610). For example, the device (e.g., using computing resource 424, processor 520, communication interface 570, and/or the like) may receive, from a client device associated with a customer, an agreement of the customer to join a rewards program in exchange for sharing data associated with items purchased by the customer, as described above.

As further shown in FIG. 6, process 600 may include receiving from the client device, and based on the customer joining the rewards program, item data identifying an item placed in a shopping cart by the customer and customer data identifying the customer, wherein the item data is received by a transaction card from a price tag of the item and via a wireless communication with the price tag, and wherein the item data is received after the client device receives, from a shelf sensor, first data indicating that the item has been removed from a shelf, and receives, from a shopping cart sensor, second data indicating that the item has been placed in the shopping cart (block 620). For example, the device (e.g., using computing resource 424, processor 520, communication interface 570, and/or the like) may receive from the client device, and based on the customer joining the rewards program, item data identifying an item placed in a shopping cart by the customer and customer data identifying the customer, as described above. In some implementations, the item data may be received by a transaction card from a price tag of the item and via a wireless communication with the price tag. In some implementations, the item data may be received after the client device receives, from a shelf sensor, first data indicating that the item has been removed from a shelf, and receives, from a shopping cart sensor, second data indicating that the item has been placed in the shopping cart.

As further shown in FIG. 6, process 600 may include receiving rewards data identifying rewards associated with a plurality of items (block 630). For example, the device (e.g., using computing resource 424, processor 520, input component 550, communication interface 570, and/or the like) may receive rewards data identifying rewards associated with a plurality of items, as described above.

As further shown in FIG. 6, process 600 may include processing the item data, the rewards data, and the customer data, with a machine learning model, to identify a reward for the customer from multiple rewards associated with the item (block 640). For example, the device (e.g., using computing resource 424, processor 520, memory 530, and/or the like) may process the item data, the rewards data, and the customer data, with a machine learning model, to identify a reward for the customer from multiple rewards associated with the item, as described above.

As further shown in FIG. 6, process 600 may include receiving, from the client device, transaction data identifying the item, a price for the item, and a merchant selling the item when the customer purchases the item from the merchant (block 650). For example, the device (e.g., using computing resource 424, processor 520, communication interface 570, and/or the like) may receive, from the client device, transaction data identifying the item, a price for the item, and a merchant selling the item when the customer purchases the item from the merchant, as described above.

As further shown in FIG. 6, process 600 may include providing, to the client device, data identifying the reward (block 660). For example, the device (e.g., using computing resource 424, processor 520, storage component 540, communication interface 570, and/or the like) may provide, to the client device, data identifying the reward, as described above.

Process 600 may include additional implementations, such as any single implementation or any combination of implementations described below and/or in connection with one or more other processes described elsewhere herein.

In a first implementation, the item data may be received based on the shelf sensor wirelessly communicating the first data to the client device, and the shopping cart sensor wirelessly communicating the second data to the client device.

In a second implementation, alone or in combination with the first implementation, receiving the rewards data identifying the rewards associated with the plurality of items may include performing a crawl of a data source associated with the plurality of items, and receiving the rewards data identifying the rewards associated with the plurality of items based on performing the crawl of the data source.

In a third implementation, alone or in combination with one or more of the first and second implementations, process 600 may include providing, to the client device, an indication that the reward was applied to the transaction card; causing a server device, associated with a financial institution managing the transaction card, to provide the reward to the transaction card; or providing, to the client device, a request for feedback as to why the item was purchased.

In a fourth implementation, alone or in combination with one or more of the first through third implementations, process 600 may include allocating reward points to the transaction card; providing, to the client device, an offer associated with the item or the merchant; or retraining the machine learning model based on the reward or based on customer feedback as to why the item was purchased.

In a fifth implementation, alone or in combination with one or more of the first through fourth implementations, process 600 may include determining spending patterns associated with the customer based on the item data; modifying the reward based on the spending patterns and to generate a modified reward; and providing data identifying the modified reward to the client device.

In a sixth implementation, alone or in combination with one or more of the first through fifth implementations, the reward may include a reward provided by a financial institution associated with the transaction card, a reward providing a percent reduction in a selling price of the item, a reward providing money back to the customer, or a reward providing reward points to the transaction card.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
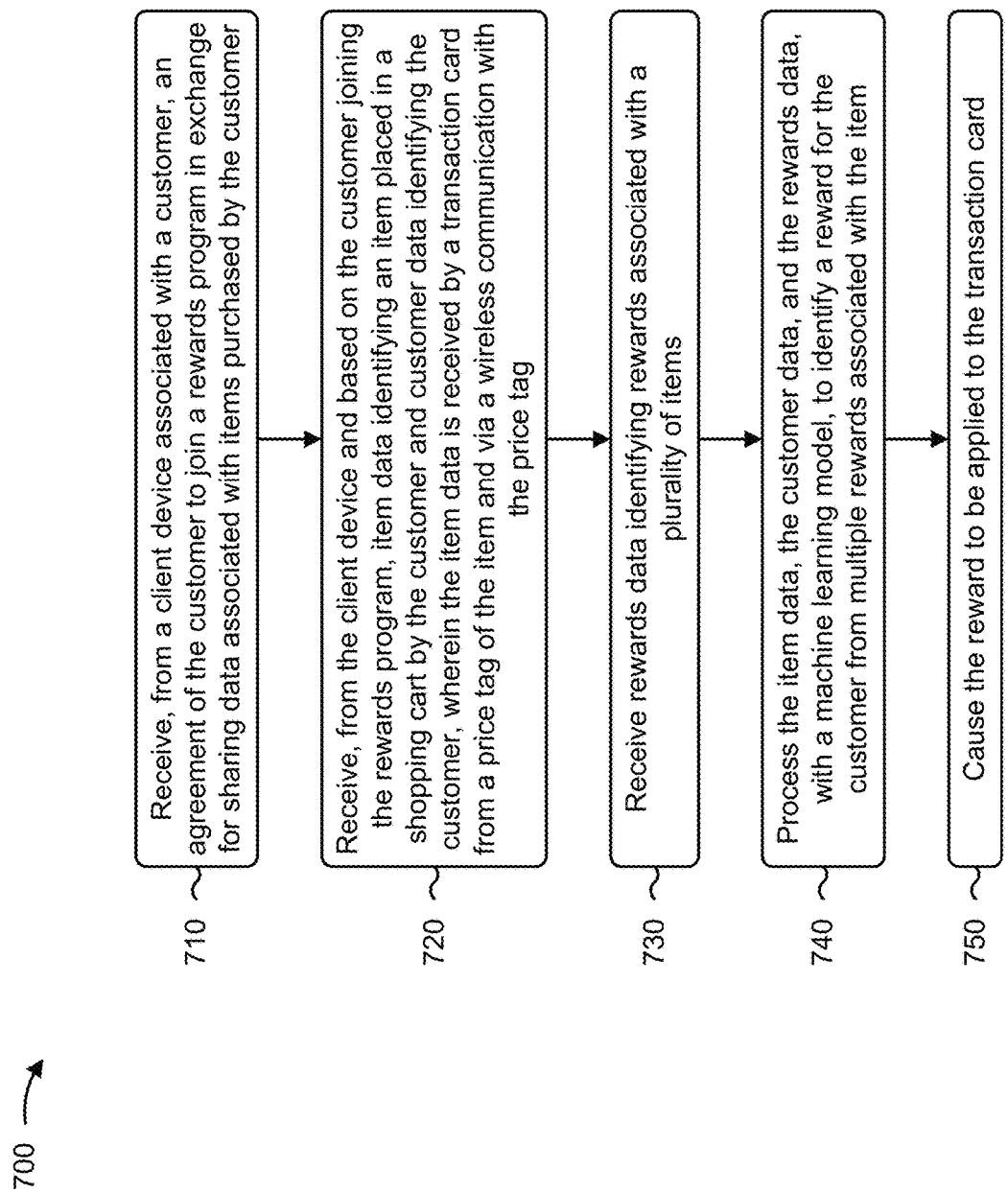

FIG. 7 is a flow chart of an example process 700 for utilizing machine learning and a smart transaction card to automatically identify item data associated with purchased items. In some implementations, one or more process blocks of FIG. 7 may be performed by a device (e.g., processing platform 420). In some implementations, one or more process blocks of FIG. 7 may be performed by another device or a group of devices separate from or including the device, such as a client device (e.g., client device 410).

As shown in FIG. 7, process 700 may include receiving, from a client device associated with a customer, an agreement of the customer to join a rewards program in exchange for sharing data associated with items purchased by the customer (block 710). For example, the device (e.g., using computing resource 424, processor 520, communication interface 570, and/or the like) may receive, from a client device associated with a customer, an agreement of the customer to join a rewards program in exchange for sharing data associated with items purchased by the customer, as described above.

As further shown in FIG. 7, process 700 may include receiving, from the client device and based on the customer joining the rewards program, item data identifying an item placed in a shopping cart by the customer and customer data identifying the customer, wherein the item data is received by a transaction card from a price tag of the item and via a wireless communication with the price tag (block 720). For example, the device (e.g., using computing resource 424, processor 520, input component 550, communication interface 570, and/or the like) may receive, from the client device and based on the customer joining the rewards program, item data identifying an item placed in a shopping cart by the customer and customer data identifying the customer, as described above. In some implementations, the item data may be received by a transaction card from a price tag of the item and via a wireless communication with the price tag.

As further shown in FIG. 7, process 700 may include receiving rewards data identifying rewards associated with a plurality of items (block 730). For example, the device (e.g., using computing resource 424, processor 520, memory 530, communication interface 570, and/or the like) may receive rewards data identifying rewards associated with a plurality of items, as described above.

As further shown in FIG. 7, process 700 may include processing the item data, the customer data, and the rewards data, with a machine learning model, to identify a reward for the customer from multiple rewards associated with the item (block 740). For example, the device (e.g., using computing resource 424, processor 520, storage component 540, and/or the like) may process the item data, the customer data, and the rewards data, with a machine learning model, to identify a reward for the customer from multiple rewards associated with the item, as described above.

As further shown in FIG. 7, process 700 may include causing the reward to be applied to the transaction card (block 750). For example, the device (e.g., using computing resource 424, processor 520, memory 530, storage component 540, communication interface 570, and/or the like) may cause the reward to be applied to the transaction card, as described above.

Process 700 may include additional implementations, such as any single implementation or any combination of implementations described below and/or in connection with one or more other processes described elsewhere herein.

In a first implementation, process 700 may include determining, based on the item data, a relationship between the item and another item in the plurality of items; generating a promotion for the other item based on the relationship between the item and the other item; and providing data identifying the promotion to the client device.

In a second implementation, alone or in combination with the first implementation, process 700 may include determining, based on the item data, a relationship between the item and another item in the plurality of items; and providing, to a server device associated with a merchant of the item, data identifying the relationship between the item and the other item, wherein the relationship may enable the server device to generate a promotion for the other item and to provide data identifying the promotion to the client device.

In a third implementation, alone or in combination with one or more of the first and second implementations, process 700 may include receiving historical item data identifying the plurality of items; receiving historical rewards data identifying historical rewards associated with the plurality of items; receiving historical customer data identifying historical customers; and training the machine learning model based on the historical item data, the historical rewards data, and the historical customer data.

In a fourth implementation, alone or in combination with one or more of the first through third implementations, process 700 may include determining spending patterns associated with the customer based on the item data; and providing, to a server device associated with a merchant of the item, data identifying the spending patterns associated with the customer, wherein the spending patterns may enable the server device to generate a promotion for the customer and to provide data identifying the promotion to the client device.

In a fifth implementation, alone or in combination with one or more of the first through fourth implementations, the item data may include data identifying a manufacturer of the item, a description of the item, a material of the item, a size of the item, a color of the item, a package associated with the item, or warranty terms associated with the item.

In a sixth implementation, alone or in combination with one or more of the first through fifth implementations, the machine learning model may include a linear classifier model, a nearest neighbor model, a support vector machine model, a decision tree model, a random forest model, or a neural network model.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
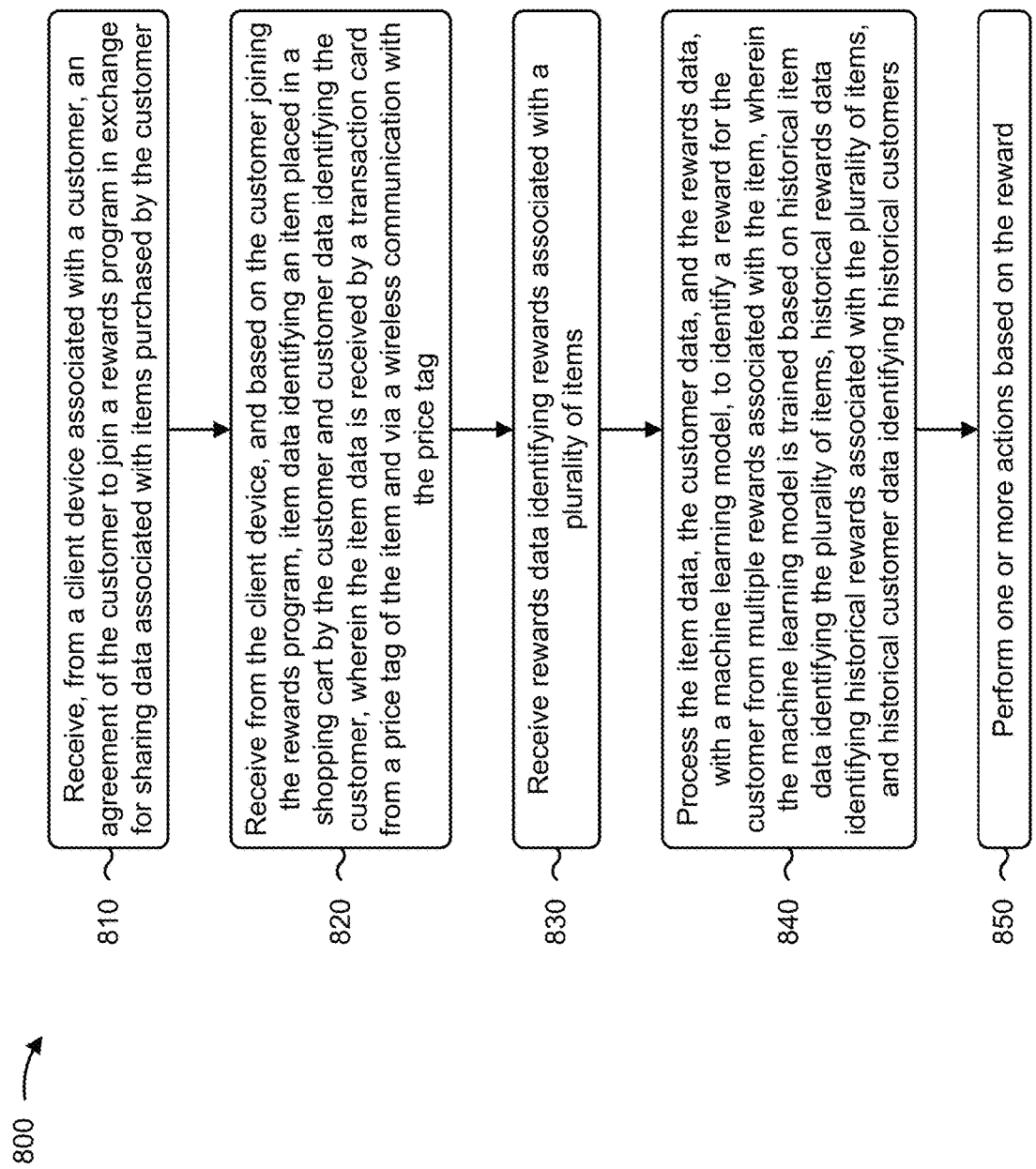

FIG. 8 is a flow chart of an example process 800 for utilizing machine learning and a smart transaction card to automatically identify item data associated with purchased items. In some implementations, one or more process blocks of FIG. 8 may be performed by a device (e.g., processing platform 420). In some implementations, one or more process blocks of FIG. 8 may be performed by another device or a group of devices separate from or including the device, such as a client device (e.g., client device 410).

As shown in FIG. 8, process 800 may include receiving, from a client device associated with a customer, an agreement of the customer to join a rewards program in exchange for sharing data associated with items purchased by the customer (block 810). For example, the device (e.g., using computing resource 424, processor 520, communication interface 570, and/or the like) may receive, from a client device associated with a customer, an agreement of the customer to join a rewards program in exchange for sharing data associated with items purchased by the customer, as described above.

As further shown in FIG. 8, process 800 may include receiving, from the client device and based on the customer joining the rewards program, item data identifying an item placed in a shopping cart by the customer and customer data identifying the customer, wherein the item data is received by a transaction card from a price tag of the item and via a wireless communication with the price tag (block 820). For example, the device (e.g., using computing resource 424, processor 520, input component 550, communication interface 570, and/or the like) may receive, from the client device and based on the customer joining the rewards program, item data identifying an item placed in a shopping cart by the customer and customer data identifying the customer, as described above. In some implementations, the item data may be received by a transaction card from a price tag of the item and via a wireless communication with the price tag.

As further shown in FIG. 8, process 800 may include receiving rewards data identifying rewards associated with a plurality of items (block 830). For example, the device (e.g., using computing resource 424, processor 520, storage component 540, communication interface 570, and/or the like) may receive rewards data identifying rewards associated with a plurality of items, as described above.

As further shown in FIG. 8, process 800 may include processing the item data, the customer data, and the rewards data, with a machine learning model, to identify a reward for the customer from multiple rewards associated with the item, wherein the machine learning model is trained based on historical item data identifying the plurality of items, historical rewards data identifying historical rewards associated with the plurality of items, and historical customer data identifying historical customers (block 840). For example, the device (e.g., using computing resource 424, processor 520, memory 530, and/or the like) may process the item data, the customer data, and the rewards data, with a machine learning model, to identify a reward for the customer from multiple rewards associated with the item, as described above. In some implementations, the machine learning model may be trained based on historical item data identifying the plurality of items, historical rewards data identifying historical rewards associated with the plurality of items, and historical customer data identifying historical customers.

As further shown in FIG. 8, process 800 may include performing one or more actions based on the reward (block 850). For example, the device (e.g., using computing resource 424, processor 520, memory 530, storage component 540, communication interface 570, and/or the like) may perform one or more actions based on the reward, as described above.

Process 800 may include additional implementations, such as any single implementation or any combination of implementations described below and/or in connection with one or more other processes described elsewhere herein.

In a first implementation, receiving the rewards data identifying the rewards associated with the plurality of items may include performing a crawl of a data source associated with the plurality of items; and receiving the rewards data identifying the rewards associated with the plurality of items based on performing the crawl of the data source.

In a second implementation, alone or in combination with the first implementation, performing may include providing, to the client device, an indication that the reward was applied to the transaction card; causing a server device, associated with a financial institution managing the transaction card, to provide the reward to the transaction card; providing, to the client device, a request for feedback as to why the item was purchased; allocating reward points to the transaction card; providing, to the client device, an offer associated with the item or a merchant of the item; or retraining the machine learning model based on the reward or based on customer feedback as to why the item was purchased.

In a third implementation, alone or in combination with one or more of the first and second implementations, process 800 may include determining spending patterns associated with the customer based on the item data; modifying the reward based on the spending patterns and to generate a modified reward; and providing data identifying the modified reward to the client device.

In a fourth implementation, alone or in combination with one or more of the first through third implementations, process 800 may include determining, based on the item data, a relationship between the item and another item in the plurality of items; generating a promotion for the other item based on the relationship between the item and the other item; and providing data identifying the promotion to the client device.

In a fifth implementation, alone or in combination with one or more of the first through fourth implementations, process 800 may include determining spending patterns associated with the customer based on the item data; generating a promotion for the customer based on the spending patterns associated with the customer; and providing data identifying the promotion to the client device.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:

receiving, by a device and from a client device associated with a customer, an agreement of the customer to join a rewards program in exchange for sharing data associated with items purchased by the customer;

receiving, by the device, from the client device, and based on the customer joining the rewards program, item data identifying an item, of a plurality of items, placed in a shopping cart by the customer and customer data identifying the customer;

receiving, by the device, rewards data identifying rewards associated with the plurality of items;

training, by the device, a machine learning model based on historical item data, historical rewards data, and historical customer data, to identify a particular award, from a plurality of rewards, associated with an item for a particular customer, wherein training the machine learning model comprises:
performing dimensionality reduction to reduce the historical item data, the historical rewards data, and the historical customer data to a feature set, and
training the machine learning model based on the feature set;

processing, by the device, the item data, the rewards data, and the customer data, with the machine learning model, to:
determine a predicted value, for a target value of a reward for the customer associated with the item based on a need to sell the item and a likelihood that the customer will purchase the item,
identify the reward, from the rewards data, based on determining the predicted value, and
perform an automated action associated with utilizing the predicted value as the reward for purchasing the item or another item;

verifying, by the device, a completed purchase of the item based on data indicating an intent of the customer to purchase the item and transaction data,
wherein the data indicating an intent of the customer to purchase the item and transaction data includes first data indicating that the item has been removed from a shelf or second data indicating that the item has been placed in the shopping cart; and providing, by the device and to the client device, data identifying the reward based on verifying the completed purchase of the item.

2. The method of claim 1, wherein the item data is received based on:
a shelf sensor wirelessly communicating first data, indicating that the item has been removed from a shelf, to the client device, and
a shopping cart sensor wirelessly communicating second data, indicating that the item has been placed in the shopping cart, to the client device.

3. The method of claim 1, wherein receiving the rewards data identifying the rewards associated with the plurality of items comprises:
performing a crawl of a data source associated with the plurality of items; and
receiving the rewards data identifying the rewards associated with the plurality of items based on performing the crawl of the data source.

4. The method of claim 1, wherein processing the item data, the rewards data, and the customer data, with the machine learning model, to perform the automated action comprises:
processing the item data, the rewards data, and the customer data, with the machine learning model, to cause, a server device associated with a financial institution managing a transaction card associated with the customer, to automatically provide the reward to the transaction card.

5. The method of claim 1, further comprising:
retraining the machine learning model based on the reward or based on customer feedback as to why the item was purchased.

6. The method of claim 1, further comprising:
determining spending patterns associated with the customer based on the item data;
modifying the reward based on the spending patterns and to generate a modified reward; and
providing data identifying the modified reward to the client device.

7. The method of claim 1, further comprising:
generating a map of item locations based on the item data and location information associated with the client device.

8. A device, comprising:
one or more memories; and
one or more processors, coupled to the one or more memories, configured to:
receive, from a client device associated with a customer, an agreement of the customer to join a rewards program in exchange for sharing data associated with items purchased by the customer;
receive, from the client device and based on the customer joining the rewards program, item data identifying an item placed in a shopping cart by the customer and customer data identifying the customer;
receive rewards data identifying rewards associated with a plurality of items;
train a machine learning model based on historical item data, historical rewards data, and historical customer data, to identify a particular award, from a plurality of rewards, associated with an item for a particular customer,
wherein the one or more processors, to train the machine learning model, are configured to:
perform dimensionality reduction to reduce the historical item data, the historical rewards data, and the historical customer data to a feature set, and
train the machine learning model based on the feature set;
process the item data, the customer data, and the rewards data, with the machine learning model, to:
determine a predicted value, for a target value of a reward for the customer and associated with the item based on a need to sell the item and a likelihood that the customer will purchase the item,
identify the reward, from the rewards data, based on determining the predicted value, and
perform an automated action associated with utilizing the predicted value as the reward;
verify a completed purchase of the item based on data indicating an intent of the customer to purchase the item and transaction data,
wherein the data indicating an intent of the customer to purchase the item and transaction data includes first data indicating that the item has been removed from a shelf or second data indicating that the item has been placed in the shopping cart; and cause the reward to be applied to a transaction card associated with the customer based on verifying the completed purchase of the item.

9. The device of claim 8, wherein the one or more processors are further configured to:

determine, based on the item data, a relationship between the item and another item in the plurality of items;

generate a promotion for the other item based on the relationship between the item and the other item; and provide data identifying the promotion to the client device.

10. The device of claim 8, wherein the one or more processors are further configured to:

determine, based on the item data, a relationship between the item and another item in the plurality of items; and provide, to a server device associated with a merchant of the item, data identifying the relationship between the item and the other item, wherein the relationship enables the server device to generate a promotion for the other item and to provide data identifying the promotion to the client device.

11. The device of claim 8, wherein the one or more processors are further configured to:

receive historical item data identifying the plurality of items;

receive historical rewards data identifying historical rewards associated with the plurality of items;

receive historical customer data identifying historical customers; and train the machine learning model based on the historical item data, the historical rewards data, and the historical customer data.

12. The device of claim 8, wherein the one or more processors are further configured to:

determine spending patterns associated with the customer based on the item data; and provide, to a server device associated with a merchant of the item, data identifying the spending patterns associated with the customer, wherein the spending patterns enable the server device to generate a promotion for the customer and to provide data identifying the promotion to the client device.

13. The device of claim 8, wherein the item data includes data identifying one or more of:

a manufacturer of the item,
a description of the item,
a material of the item,
a size of the item,
a color of the item,
a package associated with the item, or
warranty terms associated with the item.

14. The device of claim 8, wherein the machine learning model includes one or more of:

a linear classifier model,
a nearest neighbor model,
a support vector machine model,
a decision tree model,
a random forest model, or
a neural network model.

15. A non-transitory computer-readable medium storing instructions, the instructions comprising:

one or more instructions that, when executed by one or more processors, cause the one or more processors to:

receive, from a client device associated with a customer, an agreement of the customer to join a rewards program in exchange for sharing data associated with items purchased by the customer;

receive, from the client device and based on the customer joining the rewards program, item data identifying an item placed in a shopping cart by the customer and customer data identifying the customer;

receive rewards data identifying rewards associated with a plurality of items;

train a machine learning model based on historical item data, historical rewards data, and historical customer data, to identify a particular award, from a plurality of rewards, associated with an item for a particular customer, wherein the one or more instructions, that cause the one or more processors to train the machine learning model, cause the one or more processors to:

perform dimensionality reduction to reduce the historical item data, the historical rewards data, and the historical customer data to a feature set, and train the machine learning model based on the feature set;

process the item data, the customer data, and the rewards data, with the machine learning model, to:

determine a predicted value, for a target value of a reward, for the customer from multiple rewards associated with the item based on a need to sell the item and a likelihood that the customer will purchase the item, identify the reward, from the rewards data, based on determining the predicted value, and perform an automated action associated with utilizing the predicted value as the reward;

verify a completed purchase of the item based on data indicating an intent of the customer to purchase the item and transaction data, wherein the data indicating an intent of the customer to purchase the item and transaction data includes first data indicating that the item has been removed from a shelf or second data indicating that the item has been placed in the shopping cart;

provide, to the client device, data identifying the reward based on verifying the completed purchase of the item; and retrain the machine learning model after the customer purchases the item based on the item data, and the customer data.

16. The non-transitory computer-readable medium of claim 15, wherein the one or more instructions, that cause the one or more processors to receive the rewards data identifying the rewards associated with the plurality of items, cause the one or more processors to:

perform a crawl of a data source associated with the plurality of items; and receive the rewards data identifying the rewards associated with the plurality of items based on performing the crawl of the data source.

17. The non-transitory computer-readable medium of claim 15, wherein the one or more instructions, that cause the one or more processors to process the item data, the rewards data, and the customer data, with the machine learning model, to perform the automated action, cause the one or more processors to:

cause a server device, associated with a financial institution managing a transaction card associated with the customer, to automatically provide the reward to the transaction card.

18. The non-transitory computer-readable medium of claim 15, wherein the one or more instructions, when executed by the one or more processors, further cause the one or more processors to:

determine spending patterns associated with the customer based on the item data;

modify the reward based on the spending patterns and to generate a modified reward; and provide data identifying the modified reward to the client device.

19. The non-transitory computer-readable medium of claim 15, wherein the one or more instructions, when executed by the one or more processors, further cause the one or more processors to:

determine, based on the item data, a relationship between the item and another item in the plurality of items;

generate a promotion for the other item based on the relationship between the item and the other item; and provide data identifying the promotion to the client device.

20. The non-transitory computer-readable medium of claim 15, wherein the one or more instructions, when executed by the one or more processors, further cause the one or more processors to:

determine spending patterns associated with the customer based on the item data;

generate a promotion for the customer based on the spending patterns associated with the customer; and provide data identifying the promotion to the client device.

* * * * *